(12) United States Patent
Morimoto et al.

(10) Patent No.: US 7,119,552 B2
(45) Date of Patent: Oct. 10, 2006

(54) CAPACITANCE TYPE FORCE SENSORS

(75) Inventors: Hideo Morimoto, Nara (JP); Tomohiro Agaya, Nara (JP)

(73) Assignee: Nitta Corporation, Osaka (JP)

( * ) Notice: Subject to any disclaimer, the term of this patent is extended or adjusted under 35 U.S.C. 154(b) by 0 days.

(21) Appl. No.: 10/541,424

(22) PCT Filed: Jan. 6, 2003

(86) PCT No.: PCT/JP03/00025

§ 371 (c)(1),
(2), (4) Date: Jul. 5, 2005

(87) PCT Pub. No.: WO2004/061400

PCT Pub. Date: Jul. 22, 2004

(65) Prior Publication Data

US 2006/0049836 A1    Mar. 9, 2006

(51) Int. Cl.
*G01R 27/28* (2006.01)
(52) U.S. Cl. ........................ 324/661; 324/662
(58) Field of Classification Search ................. 324/661, 324/662
See application file for complete search history.

(56) References Cited

U.S. PATENT DOCUMENTS

| 4,719,538 | A | 1/1988 | Cox |
| 6,989,677 | B1 * | 1/2006 | Morimoto .................. 324/660 |

FOREIGN PATENT DOCUMENTS

| JP | 9-210723 | 8/1997 |
| JP | 9-229784 | 9/1997 |
| JP | 2001-108541 | 4/2001 |
| JP | 2002-131149 | 5/2002 |
| JP | 2003-35615 | 2/2003 |

OTHER PUBLICATIONS

Patent Abstracts of Japan, Publication No. 2001-108541 dated Apr. 4, 2001, 2 pages.
Patent Abstracts of Japan, Publication No. 2003-035615 dated Feb. 7, 2003, 2 pages.
Patent Abstracts of Japan, Publication No. 2002-131149 dated May 9, 2002, 2 pages.
Patent Abstracts of Japan, Publication No. 09-229784 dated Sep. 5, 1997, 2 pages.
Patent Abstracts of Japan, Publication No. 09-210723 dated Aug. 15, 1997, 2 pages.

* cited by examiner

*Primary Examiner*—Walter Benson
(74) *Attorney, Agent, or Firm*—Osha Liang LLP

(57) ABSTRACT

Capacitance element electrodes (E1 to E5) and a grounded reference electrode (E0) are formed on a substrate (20). A displacement electrode (40) that is Z-axially displaced in accordance with a Z-axial movement of a detective member (30) externally operated, is disposed so as to be opposed to the above electrodes (E0 to E5). The displacement electrode (40) cooperates with the reference electrode (E0) and the capacitance element electrodes (E1 to E5) to form capacitance elements (C0 to C5), respectively. Each of the capacitance elements (C1 to C5) is connected to the capacitance element (C0) in series in relation to an externally input signal. Changes in the capacitance values of the capacitance elements (C1 to C5) when the detective member (30) is moved, is detected by a signal processing circuit having hysteretic characteristics. Thereby, the displacement of the detective member (30) is detected.

21 Claims, 20 Drawing Sheets

CAPACITANCE TYPE FORCE SENSORS

TECHNICAL FIELD

The present invention relates to a capacitance type sensor suitably used for inputting operations in multidimensional directions.

BACKGROUND ART

A capacitance type sensor is used as a device for converting the intensity and direction of a force applied by an operator, into an electric signal. For example, as an input device for a game machine used is a device incorporated as a capacitance type force sensor, so-called joy stick, for inputting operations in multidimensional directions.

Using the capacitance type sensor, an operation quantity with a predetermined dynamic range can be input as the intensity of a force applied by the operator. Such a sensor may be used in the form of a two-dimensional or three-dimensional force sensor capable of detecting each directional component divided from the applied force. In particular, a capacitance type force sensor in which a capacitance element is made up of two electrodes and a force is detected on the basis of a change in the capacitance value due to a change in the interval between the electrodes, has a merit that a cost reduction can be intended by simplifying the construction. Therefore, sensors of this type have been put in practical use in various fields.

A capacitance type sensor is known that includes a pair of fixed electrodes for detecting opposite directional componential forces, and a displacement electrode disposed so as to be opposed to the pair of fixed electrodes. The capacitance type sensor detects an externally applied force on the basis of changes in the capacitance values of a capacitance element formed between one fixed electrode and the displacement electrode and a capacitance element formed between the other fixed electrode and the displacement electrode. The pair of fixed electrodes are supplied with signals, respectively. The signals are delayed on the basis of changes in the capacitance values of the respective capacitance elements, and then read by an exclusive OR circuit or the like to derive an output signal.

In the sensitivity characteristic of the above capacitance type sensor, however, each dimensional componential force may not sufficiently be detected. In addition, when the signals to be input to the respective fixed electrodes contain noises, the sensor may erroneously operate because an erroneous output signal is detected.

Therefore, a principal object of the present invention is to provide a capacitance type sensor superior in sensitivity characteristic and hard to be influenced by noise.

DISCLOSURE OF THE INVENTION

A capacitance type sensor of the present invention is characterized in that the sensor comprises a conductive member; a capacitance element electrode cooperating with the conductive member to form a first capacitance element; and a reference electrode electrically connected to the conductive member and kept at a ground potential or another fixed potential; the sensor can detect an externally applied force on the basis of detection of a change in the capacitance value of the first capacitance element by utilizing a signal input to the first electrode; and the sensor comprises two capacitance element electrodes in a pair, and output signals corresponding to signals input to a circuit including one of the capacitance element electrodes and a circuit including the other of the capacitance element electrodes, respectively, are detected by a signal processing circuit having hysteretic characteristics.

In this feature of the present invention, because a threshold value for an input signal increasing and a threshold value for the input signal decreasing are different from each other in the signal processing circuit having the hysteretic characteristics, a change in an output signal corresponding to a change in the capacitance value of the first capacitance element is wider. Thus, the sensitivity characteristic of the sensor is improved in comparison with a case wherein the output signal is detected by a signal processing circuit having no hysteretic characteristics.

In addition, even when an input signal contains noise, because the threshold value for the input signal increasing and the threshold value for the input signal decreasing are different from each other, it is suppressed to detect an erroneous output signal. Thus, an erroneous operation of the sensor under the influence of the noise can be prevented.

In the capacitance type sensor of the present invention, a second capacitance element may be formed between the reference electrode and the conductive member.

In this feature of the present invention, the conductive member used in common to form the first and second capacitance elements is electrically connected to the reference electrode being kept at the ground or other fixed potential, not by direct contact but by capacitance coupling. Thus, the withstand voltage characteristic of the sensor is improved and the sensor is scarcely broken by a spark current flowing, and in addition, inconvenience such as badness in electrical connection can be prevented. Thus, a highly reliable capacitance type sensor can be obtained. In addition to that, because the first and second capacitance elements are connected in series, there is no need of separately providing wiring for keeping the conductive member at the ground or other fixed potential if wiring is provided only on a member such as a substrate supporting the capacitance element electrode and the reference electrode. Thus, a capacitance type sensor simple in construction can be manufactured in a small number of manufacturing steps.

A capacitance type sensor of the present invention is characterized in that the sensor comprises a substrate that provides an XY plane of an XYZ three-dimensional coordinate system defined; a detective member being opposed to the substrate; a conductive member disposed between the substrate and the detective member so as to be Z-axially displaceable in accordance with Z-axial displacement of the detective member; a capacitance element electrode formed on the substrate to cooperate with the conductive member to form a first capacitance element; and a reference electrode formed on the substrate to cooperate with the conductive member to form a second capacitance element, and kept at a ground potential or another fixed potential; the first and second capacitance elements are connected in series in relation to a signal input to the capacitance element electrode, and displacement of the detective member can be detected on the basis of detection of a change in the capacitance value of the first capacitance element caused by a change in the interval between the conductive member and the capacitance element electrode; and the sensor comprises two capacitance element electrodes in a pair, and output signals corresponding to signals input to a circuit including one of the capacitance element electrodes and a circuit including the other of the capacitance element electrodes, respectively, are detected by a signal processing circuit having hysteretic characteristics.

In this feature of the present invention, like claim 1, because an output signal is detected by the signal processing circuit having the hysteretic characteristics, the sensitivity characteristic of the sensor is improved in comparison with a case wherein the output signal is detected by a signal processing circuit having no hysteretic characteristics. In addition, like claim 2, a highly reliable capacitance type sensor can be obtained.

In the capacitance type sensor of the present invention, the capacitance element electrode may include a pair of first capacitance element electrodes disposed symmetrically with respect to a Y axis, a pair of second capacitance element electrodes disposed symmetrically with respect to an X axis, and a third capacitance element electrode disposed near an origin.

In this feature of the present invention, the sensor can separately detect X-axial, Y-axial, and Z-axial components of an external force received by the detective member. The third capacitance element electrodes may not be used for detecting Z-axial components, and may be used for operation for determination of an input.

In the capacitance type sensor of the present invention, a threshold value of the signal processing circuit for an input signal increasing may be higher than a threshold value of the signal processing circuit for the input signal decreasing. In the capacitance type sensor of the present invention, a Schmitt trigger type logic element that performs one of an exclusive OR operation, an OR operation, an AND operation, and a NAND operation, may be utilized in the signal processing circuit. In the capacitance type sensor of the present invention, a Schmitt trigger type buffer element may be utilized in the signal processing circuit. In the capacitance type sensor of the present invention, a Schmitt trigger type inverter element may be utilized in the signal processing circuit. In the capacitance type sensor of the present invention, a hysteresis comparator may be utilized in the signal processing circuit. In this feature of the present invention, an output signal can be accurately detected. Further, the detection accuracy or detection sensitivity can be controlled according to need.

In the capacitance type sensor of the present invention, signals different from each other in phase may be supplied to the circuit including one of the capacitance element electrodes and the circuit including the other of the capacitance element electrodes. In this feature of the present invention, displacement of the detective member can be detected irrespective of whether or not the circuit including one of the capacitance element electrodes and the circuit including the other of the capacitance element electrodes have the same time constant.

In the capacitance type sensor of the present invention, a CR circuit including one of the capacitance element electrodes and another CR circuit including the other of the capacitance element electrodes may be different from each other in time constant. In this feature of the present invention, because the phase shift between signals by passing through the circuits can be wide, the accuracy of detection of displacement of the detective member can be improved.

In the capacitance type sensor of the present invention, the signal may be a signal in which a high level and a low level are periodically repeated, and the sensor may further comprise a control element having a function of discharging the first capacitance element when the signal is at the low level. In the capacitance type sensor of the present invention, an open collector type inverter element may be used as the control element.

In this feature of the present invention, electric charges are released from the capacitance element at a moment by the control element such as an open collector type inverter element. Thus, charging can be efficiently performed; the density of waveforms of the signal can be increased; and the sensitivity of the signal processing circuit can be improved.

BEST FORM FOR CARRYING OUT THE INVENTION

Hereinafter, a preferred embodiment of the present invention will be described with reference to drawings. In the embodiment as will be described below, a capacitance type sensor of the present invention is used as a force sensor.

Figure 1:
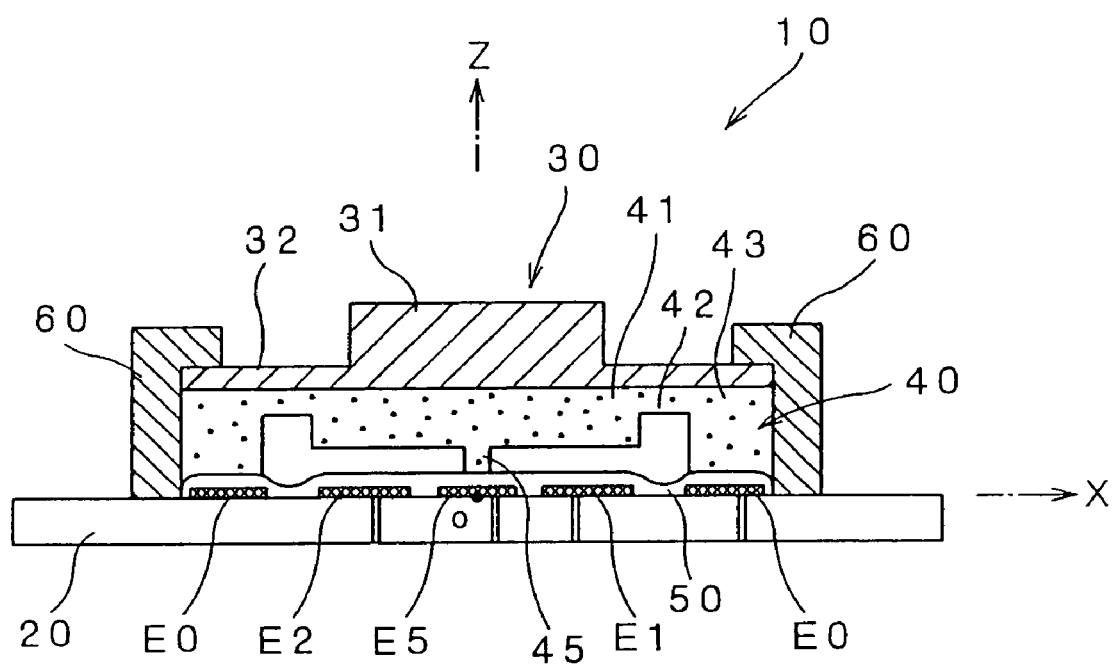
FIG. 1 is a schematic sectional view of a capacitance type sensor according to an embodiment of the present invention.
Figure 2:
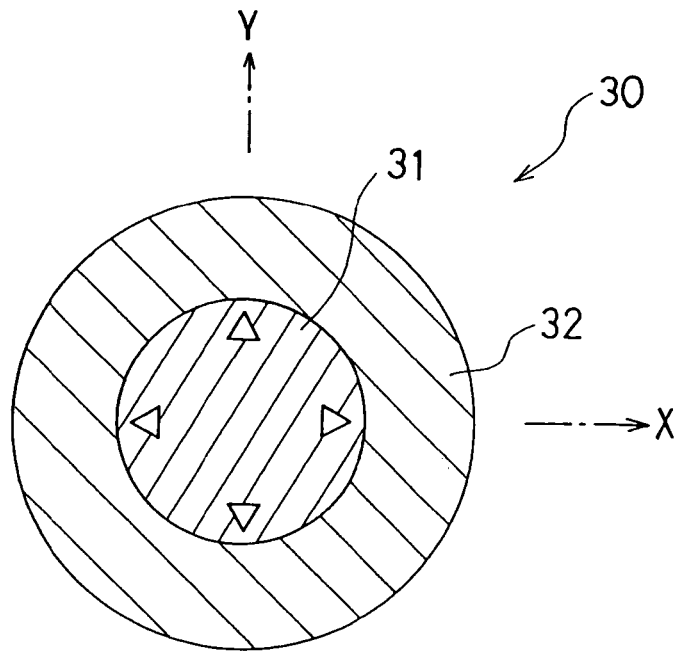
FIG. 2 is an upper view of a detective member of the capacitance type sensor of FIG. 1.
Figure 3:
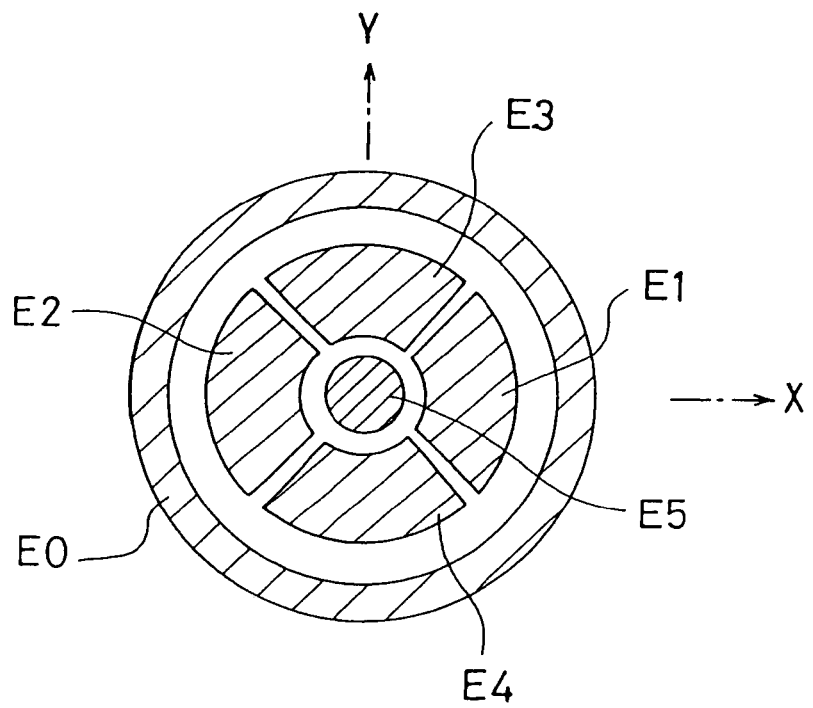
FIG. 3 is a view showing an arrangement of a plurality of electrodes formed on a substrate of the capacitance type sensor of FIG. 1.

FIG. 1 is a schematic sectional view of a capacitance type sensor according to an embodiment of the present invention. FIG. 2 is an upper view of a detective member of the capacitance type sensor of FIG. 1. FIG. 3 is a view showing an arrangement of a plurality of electrodes formed on a substrate of the capacitance type sensor of FIG. 1.

The capacitance type sensor 10 includes a substrate 20; a detective member 30 as an operation member to which a force is externally applied by operation by a human or the like; a displacement electrode 40; capacitance element electrodes E1 to E5 and a reference electrode E0 as a common electrode, formed on the substrate 20; an insulating film 50 formed in close contact with the capacitance element electrodes E1 to E5 and the reference electrode E0 to cover the corresponding part of the upper surface of the substrate 20; and a supporting member 60 for supporting and fixing the detective member 30 and the displacement electrode 40 to the substrate 20.

For convenience of explanation, an XYZ three-dimensional coordinate system is defined as shown in the drawings, and the arrangement of the above components will be explained with reference to the coordinate system. That is, in FIG. 1, the origin O is set on the substrate 20 at the position opposite to the center of the displacement electrode 40; the X-axis is set so as to extend horizontally rightward; the Z-axis is set so as to extend vertically upward; and the Y-axis is set so as to extend backward perpendicularly to FIG. 1. The upper face of the substrate 20 is on an XY-plane. The Z-axis extends through the respective centers of the capacitance element electrode E5 on the substrate 20, the detective member 30, and the displacement electrode 40.

The substrate 20 is a general printed circuit board for an electronic circuit. In this embodiment, a glass epoxy board is used. In a modification, a filmy substrate such as a polyimide film may be used as the substrate 20. In the modification, however, because such a filmy substrate may be too flexible, it is preferably disposed on a sufficiently rigid supporting board.

The detective member 30 is made up of a small-diameter upper step portion 31 as a force-receiving portion; and a large-diameter lower step portion 32 formed on the lower end of the upper step portion 31. The whole of the detective member 30 is formed into a disk shape. The diameter of the upper step portion 31 is substantially equal to or somewhat smaller than the diameter of the circle determined by connecting the outer circumferential curves of the capacitance element electrodes E1 to E4, while the diameter of the lower step portion 32 is substantially equal to the outer diameter of the reference electrode E0. In order to improve the operability, a resin cap may be put on the detective member 30.

On the upper face of the upper step portion 31 of the detective member 30, as shown in FIG. 2, indicators corresponding to the respective operation directions, i.e., movement directions of a cursor, are provided so as to correspond to the positive and negative directions of the X- and Y-axes, that is, to the respective capacitance element electrodes E1 to E4.

The displacement electrode 40 is made of conductive rubber. The displacement electrode 40 is formed into a disk shape having its diameter equal to the diameter of the lower step portion 32 of the detective member 30. The displacement electrode 40 is adhered to the lower face of the detective member 30. In the lower face of the displacement electrode 40, a circular recess open downward is formed concentrically with the displacement electrode 40. On the bottom of the recess, a circular, downward swelling is formed concentrically with the displacement electrode 40. A protrusion 45 is formed at the center of the swelling, i.e., the center of the displacement electrode 40. Thus, the displacement electrode 40 is made up of a displacement portion 41, as the swelling on the bottom of the recess formed in the lower portion of the displacement electrode 40, that is displaced attendant upon the displacement of the detective member 30; a fixed portion 43 being at the outermost position, as the portion other than the recess formed in the lower portion of the displacement electrode 40; and an interconnecting portion 42, as the portion other than the swelling of the bottom of the recess formed in the lower portion of the displacement electrode 40, interconnecting the displacement and fixed portions 41 and 43. In a modification, such a protrusion 45 may not be provided. In another modification, the displacement electrode 40 may be made of metal having electrical conductivity.

In this embodiment, the protrusion 45 is formed at the center of the displacement electrode 40, as described above. Thus, when a force is applied to the detective member 30, the displacement electrode 40 can incline with the protrusion 45 serving as a fulcrum. As well as the detective member 30, the displacement electrode 40 is supported and fixed by the supporting member 60 so that the lower faces of the fixed portion 43 and protrusion 45 can be in close contact with the insulating film 50 formed on the substrate 20. The protrusion 45 has a function of an elastic material for receiving a force in a certain extent and bringing the displacement electrode 40 near to the substrate 20 when the detective member 30 is strongly, Z-axially depressed.

On the substrate 20, as shown in FIG. 3, there are formed a circular capacitance element electrode E5 having its center at the origin O; fan-shaped capacitance element electrodes E1 to E4 disposed outside the capacitance element electrode E5; and a ring-shaped reference electrode E0 disposed outside the capacitance element electrodes E1 to E4 so that the center of the reference electrode E0 is at the origin O. The capacitance element electrodes E1 and E2 in a pair are disposed so as to be X-axially distant from each other and symmetrical with respect to the Y-axis. On the other hand, the capacitance element electrodes E3 and E4 in a pair are disposed so as to be Y-axially distant from each other and symmetrical with respect to the X-axis. In a modification, the reference electrode E0 may be formed between the capacitance element electrode E5 and the capacitance element electrodes E1 to E4. In another modification, the capacitance element electrode E5 may be omitted and there may be formed a circular reference electrode E0 having its center at the origin O. In the latter modification, however, any Z-axial component cannot be detected.

In this embodiment, the capacitance element electrode E1 is disposed so as to correspond to the X-axial positive direction while the capacitance element electrode E2 is disposed so as to correspond to the X-axial negative direction. Thus, they are used for detecting the X-axial component of an external force. On the other hand, the capacitance element electrode E3 is disposed so as to correspond to the Y-axial positive direction while the capacitance element electrode E4 is disposed so as to correspond to the Y-axial negative direction. Thus, they are used for detecting the Y-axial component of an external force. Further, the capacitance element electrode E5 is disposed on the origin O and it is used for detecting the Z-axial component of an external force.

Figure 4:
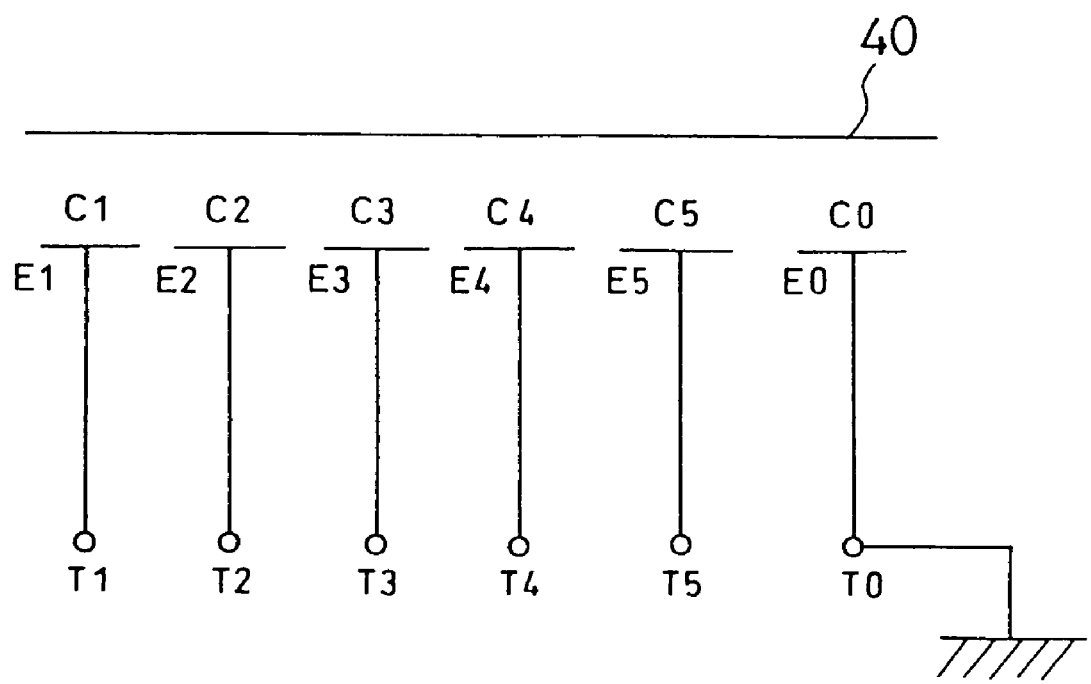
FIG. 4 is a circuit diagram equivalent to the construction of the capacitance type sensor shown in FIG. 1.

The reference electrode E0 and the capacitance element electrodes E1 to E5 are connected to terminals T0 to T5, as shown in FIG. 4, using through-holes or the like, respectively. They are connected to an external electronic circuit through the terminals T0 to T5. In this embodiment, the reference electrode E0 is grounded through the terminal T0.

The insulating film 50 is formed in close contact with the capacitance element electrodes E1 to E5 and reference electrode E0 on the substrate 20 to cover the corresponding part of the upper face of the substrate 20. Therefore, the capacitance element electrodes E1 to E5 and reference electrode E0, which are made of copper or the like, are never exposed to air. Thus, the insulating film 50 has a function of preventing them from being oxidized. In addition, because the insulating film 50 is formed, the displacement electrode 40 is never brought into direct contact with the capacitance element electrodes E1 to E5 and reference electrode E0.

Thus, each of the capacitance element electrodes E1 to E5 and reference electrode E0 cooperates with the displacement electrode 40 to form a capacitance element between them. More specifically, the capacitance element electrodes E1 to E5 cooperate with the displacement portion 41 of the displacement electrode 40 to form capacitance elements C1 to C5, respectively. The reference electrode E0 cooperates with the fixed portion 43 of the displacement electrode 40 to form a capacitance element C0.

Figure 5:
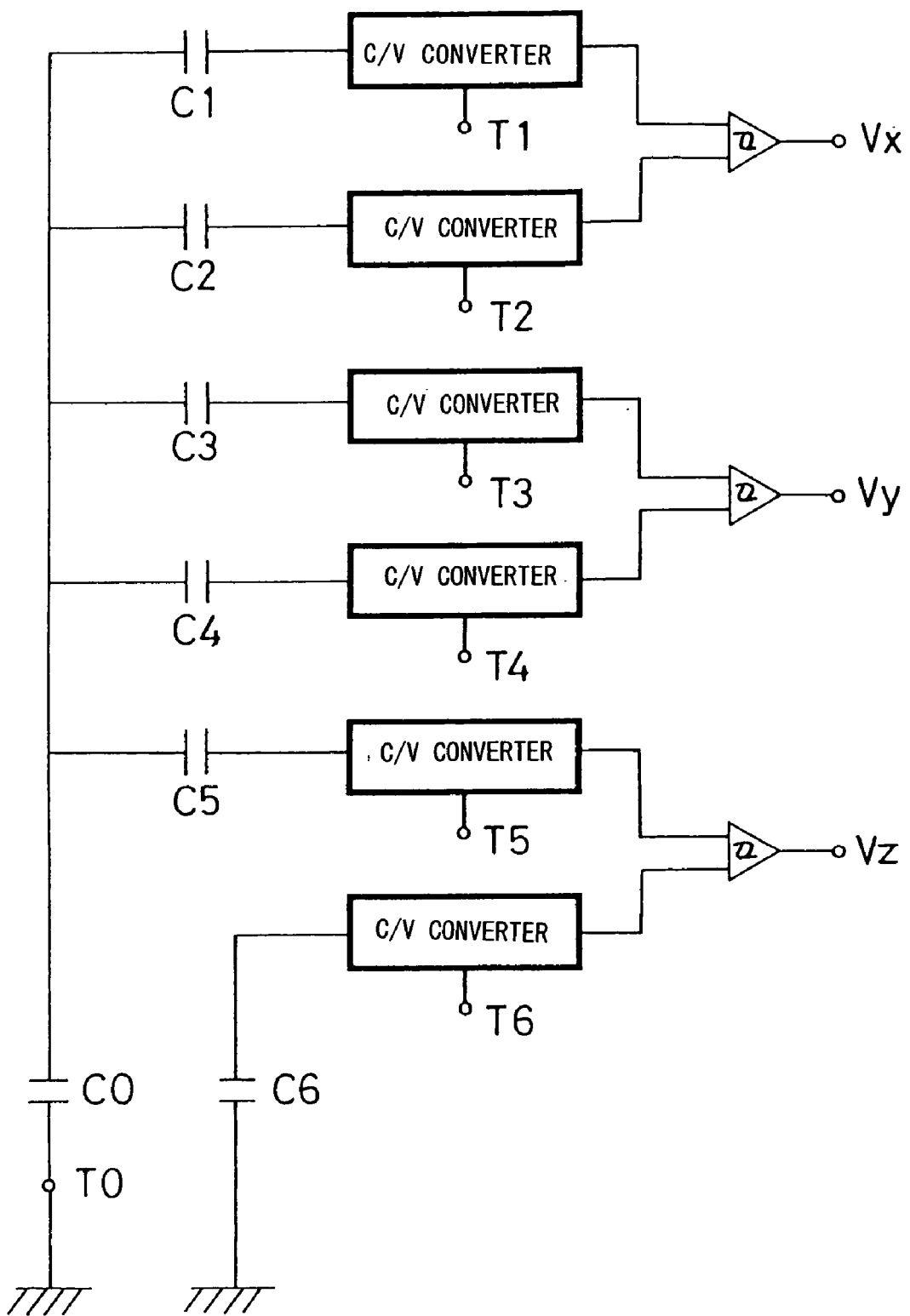
FIG. 5 is an explanatory diagram for explaining a method for deriving an output signal from a periodic signal being input to the capacitance type sensor shown in FIG. 1.
Figure 6:
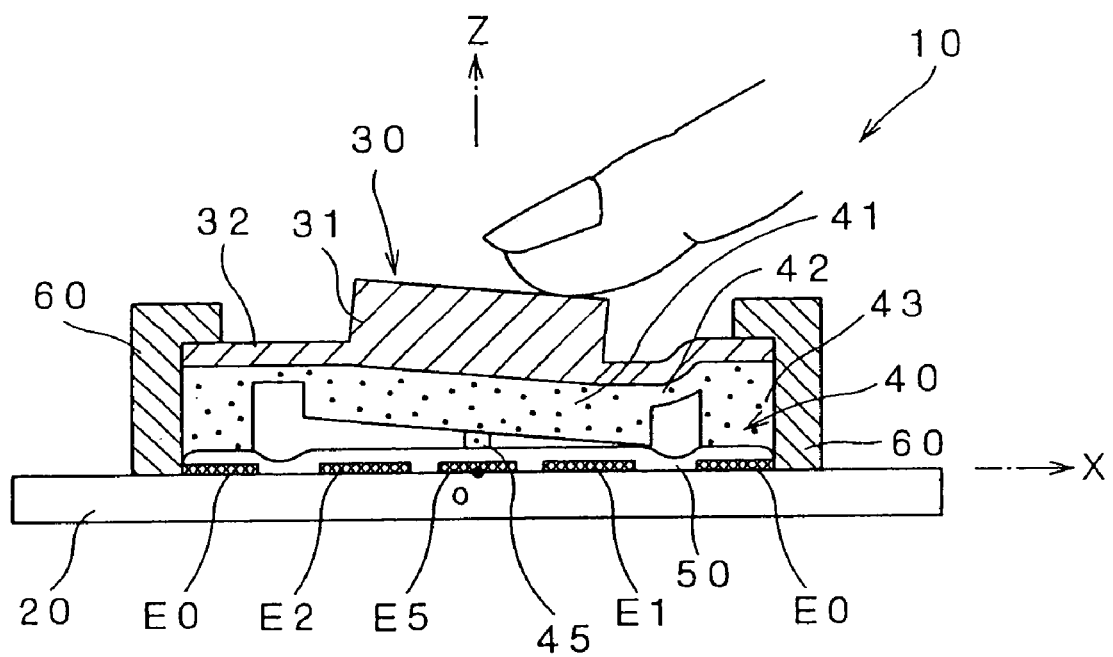
FIG. 6 is a schematic side sectional view when an operation in the X-axial positive direction is applied to the detective member of the capacitance type sensor shown in FIG. 1.

Next, an operation of the capacitance type sensor 10 according to this embodiment constructed as described above will be described with reference to drawings. FIG. 4 is a circuit diagram equivalent to the construction of the capacitance type sensor shown in FIG. 1. FIG. 5 is an explanatory diagram for explaining a method for deriving an output signal from a periodic signal being input to the capacitance type sensor shown in FIG. 1. FIG. 6 is a schematic side sectional view when an operation in the X-axial positive direction is applied to the detective member of the capacitance type sensor shown in FIG. 1.

First, a circuit construction equivalent to the construction of the capacitance type sensor 10 will be described with reference to FIG. 4. The capacitance element electrodes E1 to E5 and reference electrode E0 formed on the substrate 20 are opposed to the displacement electrode 40. The capacitance elements C0 to C5 are formed between the deformable displacement electrode 40 as a common electrode and the fixed reference electrode E0 and capacitance element electrodes E1 to E5, respectively. The capacitance elements C1 to C5 are variable capacitance elements whose capacitance values change due to the deformation of the displacement electrode 40.

The capacitance values of the capacitance elements C0 to C5 can be measured independently of one another as the capacitance values between the displacement electrode 40 and the respective terminals T0 to T5 connected to the reference electrode E0 and capacitance element electrodes E1 to E5. The reference electrode E0 is grounded through the terminal T0. Thus, the displacement electrode 40 as a common electrode of the capacitance elements C1 to C5 is considered to be grounded through the capacitance element C0 and the terminal T0. That is, the capacitance element C0 makes capacitive coupling between the displacement electrode 40 and the terminal T0.

Next, a deriving method of an output signal indicating the intensity and direction of an external force applied to the detective member 30, from a change in the capacitance value of each of the capacitance elements C1 to C5, will be described with reference to FIG. 5. In FIG. 5, output signals $V_x$, $V_y$, and $V_z$ indicate the intensities and directions of the X-axial, Y-axial, and Z-axial components of an external force, respectively. To indicate that any of the output signals $V_x$, $V_y$, and $V_z$ is output from a Schmitt trigger type logic element included in a signal processing circuit having hysteretic characteristics, the symbol of each logic element is given therein a mark symbolizing the hysteretic characteristics.

A capacitance element C6 as shown in FIG. 5 is formed on the lower face of the substrate 20 so as to always keep a certain capacitance value. One electrode constituting the capacitance element C6 is connected to a C/V converter for deriving the output signal $V_z$, and the other electrode is grounded. The capacitance element C6 is used in cooperation with the capacitance element C5 to derive the output signal $V_z$ for the Z-axial component of an external force. In a modification, the input capacitance of an IC may be used as the capacitance element C6. In another modification, such a capacitance element C6 may be formed by a not-shown sixth electrode E6 and a portion of the displacement electrode 40 hard to be deformed.

In this embodiment, for deriving the output signals $V_x$, $V_y$, and $V_z$, a periodic signal such as a clock signal is always being input to each of the terminals T1 to T6. For example, with respect to the periodic signal being input to the terminal T1, two capacitance elements C1 and C0 are connected in series. Likewise, two capacitance elements C2 and C0 are connected in series with respect to the periodic signal being input to the terminal T2; two capacitance elements C3 and C0 are connected in series with respect to the periodic signal being input to the terminal T3; two capacitance elements C4 and C0 are connected in series with respect to the periodic signal being input to the terminal T4; and two capacitance elements C5 and C0 are connected in series with respect to the periodic signal being input to the terminal T5.

When the detective member 30 receives an external force to be deformed in a state wherein the periodic signals are being input to the terminals T1 to T6, the displacement electrode 40 is Z-axially deformed accordingly. The interval between the electrodes of each of the capacitance elements C1 to C5 then changes and thereby the capacitance values of the respective capacitance elements C1 to C5 change. As a result, phase shifts occur in the periodic signals being input to the terminals T1 to T6. Using the phase shifts thus occurring in the cyclic signals, the output signals $V_x$, $V_y$, and $V_z$ can be obtained that indicate the displacement of the detective member 30, that is, the X-axial, Y-axial, and Z-axial intensities and directions of the external force received by the detective member 30.

More specifically, when periodic signals are being input to the terminals T1 to T6, a periodic signal A is being input to the terminals T1, T3, and T5, and another periodic signal B having the same cycle as the periodic signal A and different in phase from the periodic signal A is being input to the terminals T2, T4, and T6. In this case, when the detective member 30 receives an external force and the capacitance values of the respective capacitance elements C1 to C5 change, different quantities of phase shifts occur in the periodic signal A or B being input to the terminals T1 to T5. At this time, no phase shift occurs in the periodic signal B being input to the terminal T6 because the capacitance value of the capacitance element C6 dose not change.

When the external force has its X-axial component, the capacitance value of the capacitance element C1 changes and it causes a phase shift in the periodic signal A being input to the terminal T1. In addition, the capacitance value of the capacitance element C2 changes and it causes a phase shift also in the periodic signal B being input to the terminal T2. The changes in the capacitance values of the capacitance elements C1 and C2 correspond to the X-axial positive and negative components of the external force, respectively. Therefore, the phase shift in the periodic signal A being input to the terminal T1 is in the reverse direction to the phase shift in the periodic signal B being input to the terminal T2. The respective phase shifts in the periodic signals A and B being input to the terminals T1 and T2 are read by an exclusive OR circuit to derive an output signal $V_x$. The sign of the output signal $V_x$ indicates whether the X-axial component of the external force is in the positive or negative direction. The absolute value of the output signal $V_x$ indicates the intensity of the X-axial component.

When the external force has its Y-axial component, the capacitance value of the capacitance element C3 changes and it causes a phase shift in the periodic signal A being input to the terminal T3. In addition, the capacitance value of the capacitance element C4 changes and it causes a phase shift also in the periodic signal B being input to the terminal T4. The changes in the capacitance values of the capacitance elements C3 and C4 correspond to the Y-axial positive and negative components of the external force, respectively. Therefore, the phase shift in the periodic signal A being input to the terminal T3 is in the reverse direction to the phase shift in the periodic signal B being input to the terminal T4. The respective phase shifts in the periodic signals A and B being input to the terminals T3 and T4 are read by an exclusive OR circuit to derive an output signal $V_y$. The sign of the output signal $V_y$ indicates whether the Y-axial component of the external force is in the positive or negative direction. The absolute value of the output signal $V_y$ indicates the intensity of the Y-axial component.

When the external force has its Z-axial component, the capacitance value of the capacitance element C5 changes and it causes a phase shift in the periodic signal A being input to the terminal T5. In this case, no phase shift occurs in the periodic signal B being input to the terminal T6 because the capacitance value of the capacitance element C6 is kept constant. Thus, the phase shift occurs only in the periodic signal A being input to the terminal T5. The phase shift in the periodic signal A is read by an exclusive OR circuit to derive an output signal $V_z$. The sign of the output signal $V_z$ indicates whether the Z-axial component of the external force is in the positive or negative direction. The absolute value of the output signal $V_z$ indicates the intensity of the Z-axial component.

Incidentally, when the external force has its X-axial or Y-axial component, in accordance with the manner of application of the force to the detective member 30, the following cases are thinkable. For example, as for the X-axial directions, there may be a case wherein the X-axial positive and negative parts of the displacement portion 41 are deformed with the protrusion 45 serving as a fulcrum, not in the vertically reverse directions to each other but so that both the X-axial positive and negative parts are deformed downward in different quantities. In this case, although phase shifts in the same direction occur in the periodic signals A and B being input to the terminals T1 and T2, an output signal $V_x$ can be derived by the exclusive OR circuit reading the phase shifts, like the above-described case. The same applies to the case of deriving an output signal $V_y$ with respect to the Y-axis.

Next, a case will be described wherein, in a state wherein no force has been applied to the detective member 30 shown in FIG. 1, as shown in FIG. 6, an operation in the X-axial positive direction is applied to the detective member 30, that is, a force in the Z-axial negative direction is applied to the detective member 30 so that the indicator formed on the upper step portion 31 of the detective member 30 to correspond to the X-axial positive direction may be depressed toward the substrate 20.

By depressing the part of the detective member 30 corresponding to the X-axial positive direction, the interconnecting portion 42 of the displacement electrode 40 is elastically deformed and bent. The X-axial positive part of the displacement portion 41 thereby moves downward. In a short time, the X-axial positive part of the displacement portion 41 reaches the position at which the lower surface of the displacement portion 41 is in contact with the insulating film 50. At this time, the X-axial positive and negative parts of the displacement portion 41 move in the vertically reverse directions to each other, with the protrusion 45 serving as a fulcrum. Therefore, when the X-axial positive part of the displacement portion 41 moves downward, the X-axial negative part of the displacement portion 41 moves upward, with the protrusion 45 serving as a fulcrum.

In addition, a portion of the Y-axial positive part of the displacement portion 41 near the X-axial positive part somewhat moves downward, while a portion of the Y-axial positive part near the X-axial negative part somewhat moves upward. Likewise, a portion of the Y-axial negative part near the X-axial positive part somewhat moves downward, while a portion of the Y-axial negative part near the X-axial negative part somewhat moves upward. Further, at this time, the protrusion 45 formed at the center of the displacement portion 41 on the Z-axis is crushed and elastically deformed.

Thus, the interval between the X-axial positive part of the displacement portion 41 and the capacitance element electrode E1 decreases, while the interval between the X-axial negative part of the displacement portion 41 and the capacitance element electrode E2 increases. The interval between the Y-axial positive part of the displacement portion 41 and the capacitance element electrode E3 and the interval between the Y-axial negative part of the displacement portion 41 and the capacitance element electrode E4 are considered to be unchanged when they are averaged. Actually, as described above, the portions of the Y-axial positive and negative parts of the displacement portion 41 near the X-axial positive part somewhat move downward and the portions of the Y-axial positive and negative parts near the X-axial negative part somewhat move upward. On the whole, however, the respective intervals between the Y-axial positive and negative parts of the displacement portion 41 and the capacitance element electrodes E3 and E4 can be considered to be unchanged. In addition, even if the interval between the Y-axial positive part of the displacement portion 41 and the capacitance element electrode E3 and the interval between the Y-axial negative part of the displacement portion 41 and the capacitance element electrode E4 partially change, the quantities of changes in the capacitance values of the capacitance element C3 formed between the Y-axial positive part of the displacement portion 41 and the capacitance element electrode E3, and the capacitance element C4 formed between the Y-axial negative part of the displacement portion 41 and the capacitance element electrode E4 are considered to be equal to each other because of their mechanical symmetry. Thus, there appears no output by the operation principle. On the other hand, the interval between the central part of the displacement portion 41 and the capacitance element electrode E5 decreases.

Thus, of the capacitance elements C1 to C5, changes occur only in the capacitance values of the capacitance elements C1, C2, and C5 that have suffered changes in the intervals between the capacitance element electrodes and the displacement electrode 40. In general, the capacitance value of a capacitance element is in inverse proportion to the interval between the electrodes forming the capacitance element. Thus, the capacitance value of the capacitance element C1 increases while the capacitance value of the capacitance element C2 decreases. As a result, the relation in magnitude among the capacitance values of the capacitance elements C1 to C4 is as follows:

C2 smaller than C3 equal to C4 smaller than C1. The capacitance value of the capacitance element C5 increases from its original value.

At this time, phase shifts occur in the periodic signals A and B being input to the terminals T1 and T2. The phase shifts are read to derive an output signal $V_x$. Likewise, a phase shift occurs in the periodic signal A being input to the terminal T5 and the phase shift is read, actually, together with the phase of the periodic signal B being input to the terminal T6, to derive an output signal $V_y$.

Figure 7:
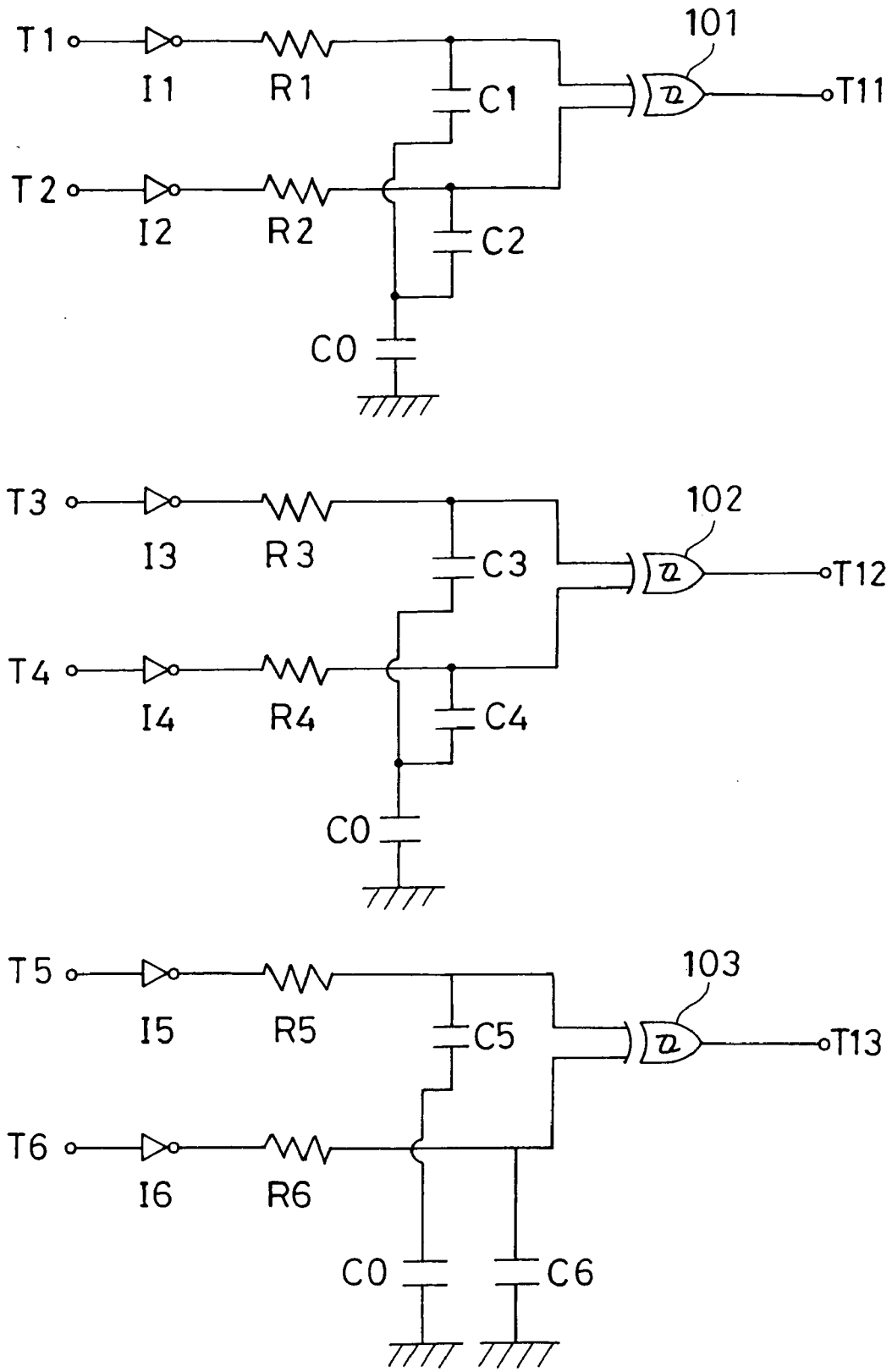
FIG. 7 is a circuit diagram showing a signal processing circuit of the capacitance type sensor shown in FIG. 1.
Figure 8:
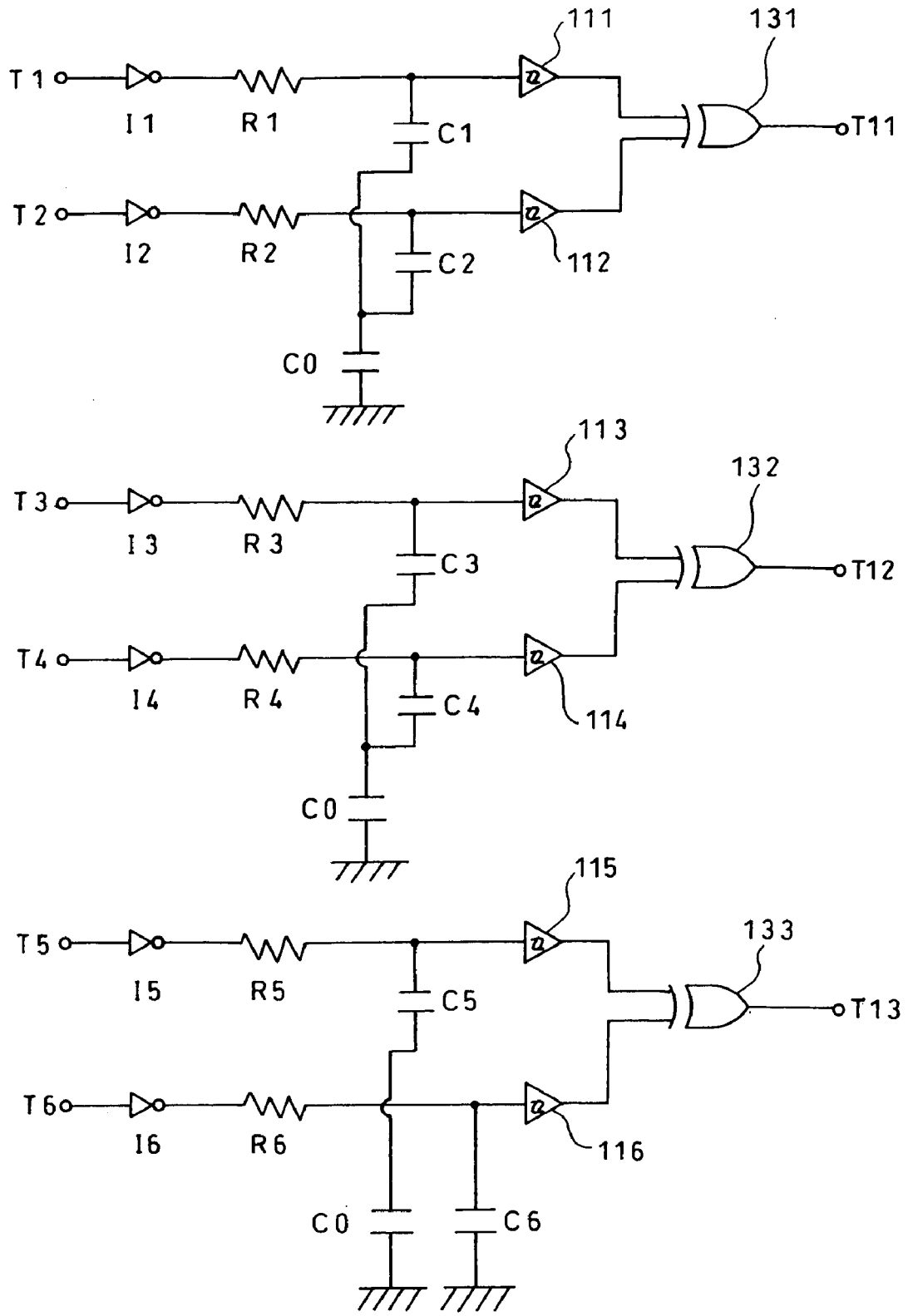
FIG. 8 is a circuit diagram equivalent to the signal processing circuit of the capacitance type sensor shown in FIG. 7.
Figure 9:
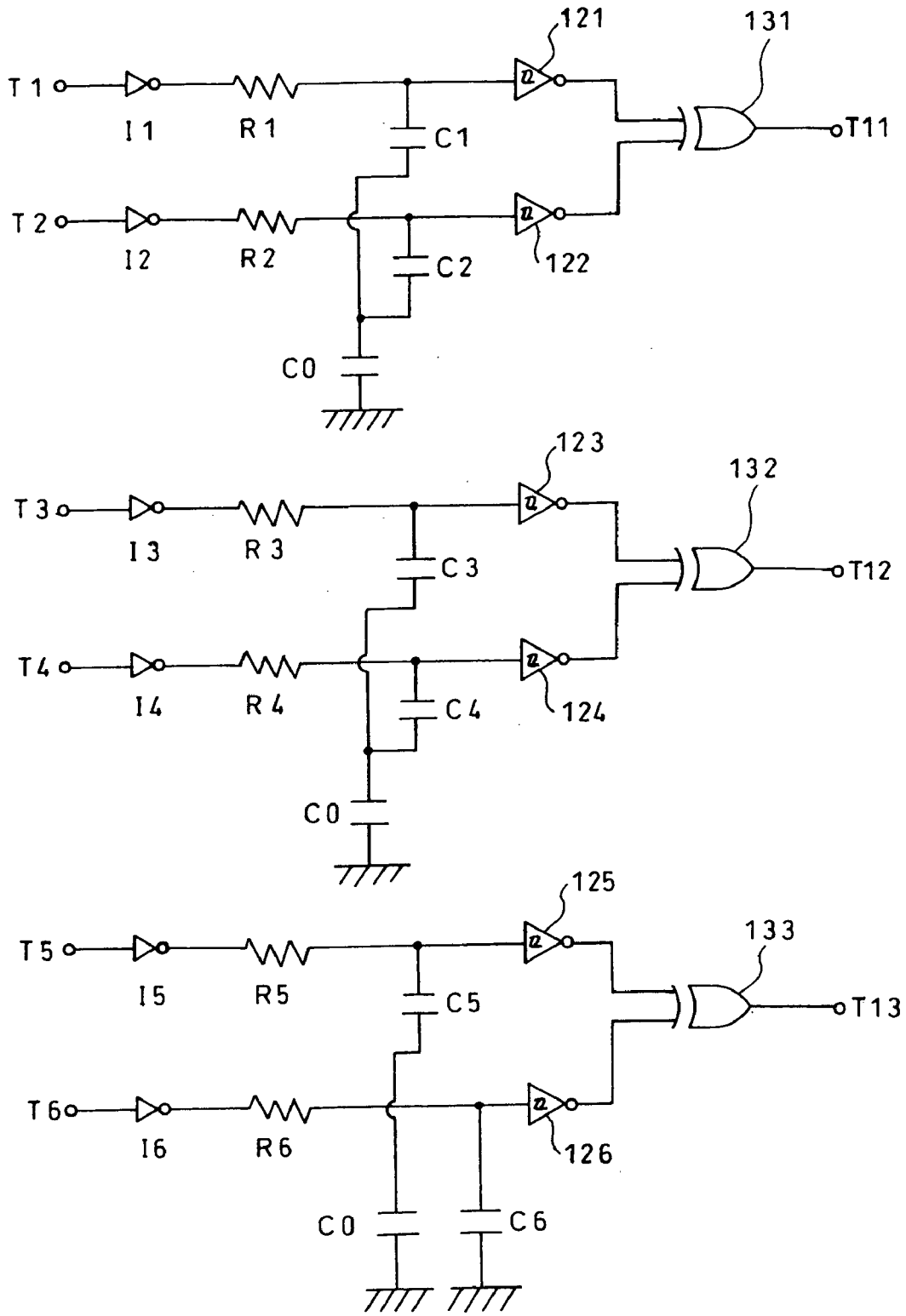
FIG. 9 is a circuit diagram equivalent to the signal processing circuit of the capacitance type sensor shown in FIG. 7.

Next, a signal processing circuit for deriving output signals $V_x$, $V_y$, and $V_z$ from the periodic signals A and B being input to the terminals T1 to T6 will be described with reference to FIG. 7. FIG. 7 is a circuit diagram showing a signal processing circuit of the capacitance type sensor shown in FIG. 1. FIGS. 8 and 9 are circuit diagrams showing signal processing circuits equivalent to the signal processing circuit of the capacitance type sensor shown in FIG. 7.

As described above, periodic signals of a predetermined frequency are being input to the terminals T1 to T6 from a not-shown AC signal oscillator. Inverter elements I1 to I6 and resistance elements R1 to R6 are connected to the terminals T1 to T6, respectively. The inverter elements I1 to I6 and the resistance elements R1 to R6 are connected in this order from the terminals T1 to T6, respectively. EX-OR elements 101 to 103 as logic elements of Schmitt trigger type exclusive OR circuits are connected to the output terminals of the resistance elements R1 and R2, the output terminals of the resistance elements R3 and R4, and the output terminals of the resistance elements R5 and R6, respectively. The output terminals of the EX-OR elements 101 to 103 are connected to terminals T11 to T13, respectively. The output terminals of the resistance elements R1 to R5 are connected to the capacitance element electrodes E1 to E5 to form the respective capacitance elements C1 to C5 in cooperation with the displacement electrode 40. The displacement electrode 40 is grounded through the capacitance element C0.

In a modification, the signal processing circuit using the EX-OR elements 101 to 103 as logic elements of Schmitt trigger type exclusive OR circuits, shown in FIG. 7, can be changed into a signal processing circuit using Schmitt trigger type buffer elements 111 to 116, as shown in FIG. 8, or a signal processing circuit using Schmitt trigger type inverter elements 121 to 126, as shown in FIG. 9. These signal processing circuits are equivalent to one another.

Hereinafter, by way of example, a deriving method of an output signal $V_x$ for X-axial component will be described with reference to FIG. 10. Because deriving methods of an output signal $V_y$ for Y-axial component and an output signal $V_z$ for Z-axial component are the same as the deriving method of the output signal $V_x$ for X-axial component, the description of the deriving methods of the output signal $V_y$ for Y-axial component and the output signal $V_z$ for Z-axial component is omitted. Either of FIGS. 10(a) and 10(b) is a circuit diagram, as part of FIG. 8, showing a signal processing circuit for X-axial component in the capacitance type sensor shown in FIG. 1. Because the circuit diagrams showing the signal processing circuits of FIGS. 7 to 9 are equivalent to one another, the deriving method of the output signal $V_x$ for X-axial component will be described below on the basis of FIG. 8.

In this signal processing circuit, the capacitance element C1 and the resistance element R1 forms a CR delay circuit, and the capacitance element C2 and the resistance element R2 forms another CR delay circuit. Periodic signals, as rectangular wave signals, being input to the terminals T1 and T2 suffer predetermined delays due to the respective CR delay circuits; they pass through the Schmitt trigger type buffer elements 111 and 112; and then they meet each other in an EX-OR element 131. Because identical elements are used as the inverter elements I1 and I2, the signals through the different paths can be compared under the same conditions. The inverter elements I1 and I2 are elements to produce driving powers sufficient for driving the respective CR delay circuits, and they are logically meaningless elements. Therefore, if the terminals T1 and T2 can be supplied with signals each having sufficient driving ability, the inverter elements I1 and I2 may be omitted. In FIG. 10(b), there have been omitted the inverter elements I1 and I2 that are included in the signal processing circuit of FIG. 10(a). Thus, the circuit of FIG. 10(b) is considered to be quite equivalent to the circuit of FIG. 10(a).

Figure 11:
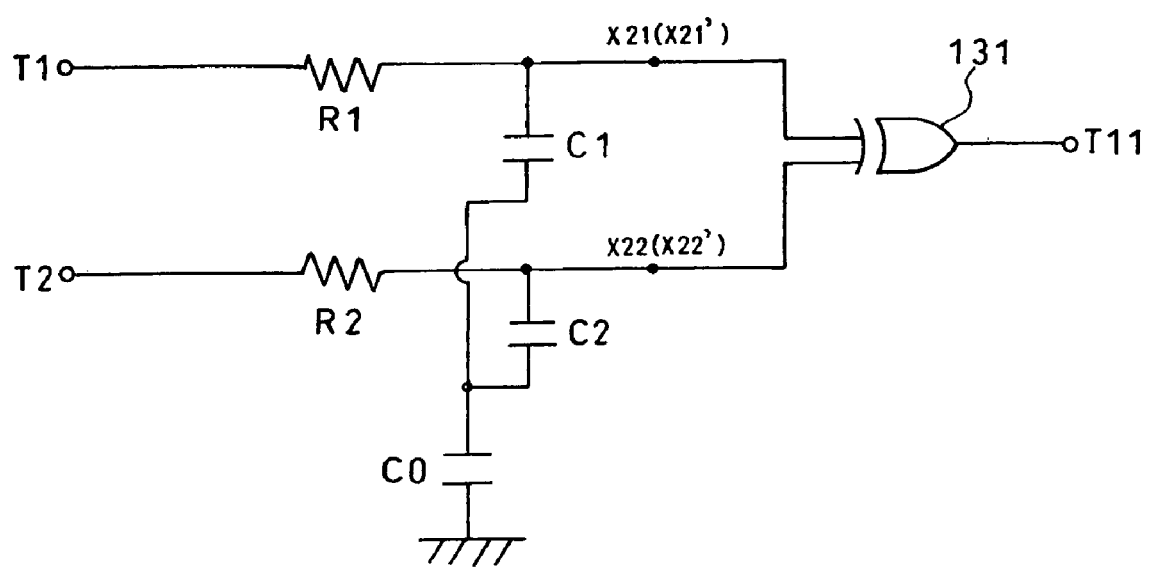
FIG. 11 is a circuit diagram showing a signal processing circuit for comparison with a signal processing circuit shown in FIG. 10.
Figure 12:
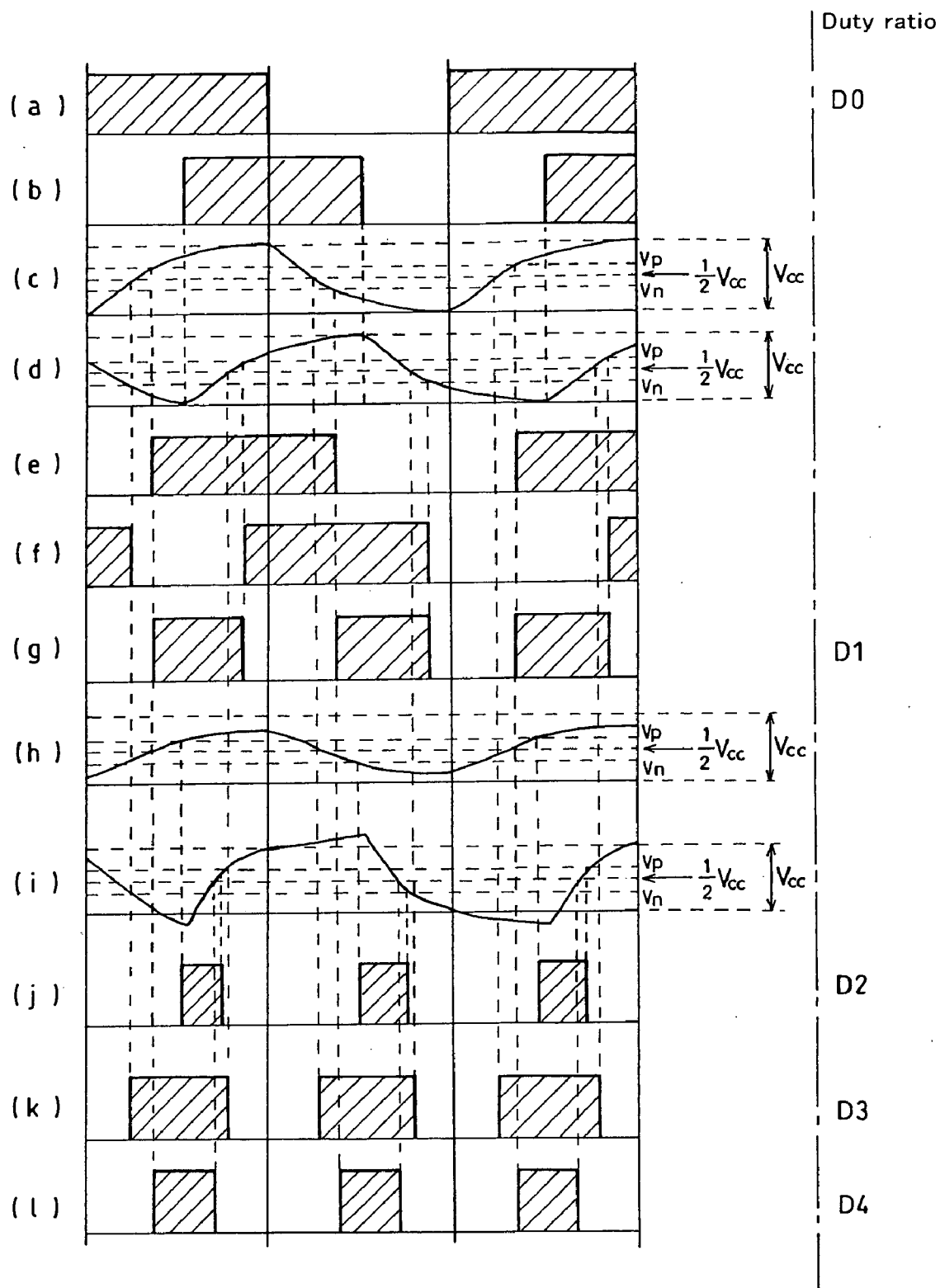
FIG. 12 is a chart showing waveforms of periodic signals at terminals and nodes of the signal processing circuit shown in FIG. 1.

Next, a signal processing circuit of the capacitance type sensor according to this embodiment will be described with reference to drawings. FIG. 11 is a circuit diagram showing a signal processing circuit for comparison with a signal processing circuit shown in FIG. 10. FIG. 12 is a chart showing waveforms of periodic signals at terminals and nodes of the signal processing circuits shown in FIGS. 10 and 11.

As for the signal processing circuit shown in FIG. 10(b), the waveforms of periodic signals at terminals and nodes when the periodic signals are being input to the respective terminals T1 and T2 will be described with being compared with the waveforms of the periodic signals at terminals and nodes when a signal processing circuit not having hysteretic characteristics, as shown in FIG. 11, is used as a signal processing circuit of the capacitance type sensor according to this embodiment.

In the signal processing circuit of FIG. 10(b), the periodic signals being input to the respective terminals T1 and T2 suffer predetermined delays by passing through the CR delay circuits; they pass through the Schmitt trigger type buffer elements 111 and 112; and then they are input to the EX-OR element 131. More specifically, a periodic signal f(phi) (corresponding to the above-described periodic signal A and hereinafter referred to as the periodic signal A) is being input to the terminal T1, while a periodic signal f(phi-theta) (corresponding to the above-described periodic signal B and hereinafter referred to as the periodic signal B) having the same cycle as the periodic signal f(phi) and different in phase by theta, is being input to the terminal T2. In this embodiment, a case will be described wherein the duty ratio of the periodic signal A is 50% and the periodic signal B is delayed in phase from the periodic signal A by a quarter of the cycle of the periodic signal A. In FIG. 12, (a) and (b) show the waveforms of the periodic signals A and B being input to the terminals T1 and T2, respectively.

In this embodiment, the periodic signals A and B different in phase, to be input to the respective terminals T1 and T2, can be generated in the manner that a periodic signal output from a single AC signal oscillator is divided into two paths; a not-shown CR delay circuit is provided in one of the paths; and thereby the phase of the periodic signal having passed through the CR delay circuit is delayed. But, the method for shifting the phase of the periodic signal is not limited to such a method using a CR delay circuit. Any other method may be used. In a modification, two AC signal oscillators may be used for generating periodic signals A and B different in phase, to be input to the respective terminals T1 and T2.

In the signal processing circuit of FIG. 10(b), the periodic signals A and B being input to the terminals T1 and T2 are delayed by passing through the delay circuit constituted by the capacitance element C1 and the resistance element R1, and the delay circuit constituted by the capacitance element C2 and the resistance element R2; and then they reach nodes X11 and X12, respectively. The capacitance values of the capacitance elements C1 and C2 in a state wherein the detective member 30 is receiving no external force, i.e., no operation is applied to the detective member 30, are the capacitance values based on the intervals between the displacement electrode 40 and the capacitance element electrodes E1 and E2 in a state wherein the detective member 30 is receiving no external force. FIG. 12(c) shows a change in the potential at the node X11 of the signal processing circuit shown in FIG. 10(b). FIG. 12(d) shows a change in the potential at the node X12 of the signal processing circuit shown in FIG. 10(b).

In the case that a periodic signal in which "Hi" and "Lo" signals are repeated is input to the terminal T1, as shown in FIG. 12(c), after starting the input of a "Hi" signal, charges are gradually stored in the capacitance element C1 constituting a CR delay circuit, so that the potential at the node X11 gradually rises. On the other hand, after starting the input of a "Lo" signal, charges are gradually released from the capacitance element C1 constituting the CR delay circuit, so that the potential at the node X11 gradually lowers. These changes are repeated. Also in the case that a periodic signal in which "Hi" and "Lo" signals are repeated is input to the terminal T2, as shown in FIG. 12(d), changes similar to those in the potential at the node X11 are repeated in the potential at the node X12.

The waveforms of the potentials at the nodes X11 and X12 are input to the Schmitt trigger type buffer elements 111 and 112 to be converted into rectangular waves as shown in (e) and (f) of FIG. 12. FIG. 12(e) shows the periodic signal waveform at a node X13 of the signal processing circuit shown in FIG. 10(b). FIG. 12(f) shows the periodic signal waveform at a node X14 of the signal processing circuit shown in FIG. 10(b).

Conversion processing by the Schmitt trigger type buffer elements 111 and 112 will be described below in detail. In the Schmitt trigger type buffer elements 111 and 112, the threshold voltage for the input voltage rising (hereinafter referred to as positive threshold voltage Vp) and the threshold voltage for the input voltage lowering (hereinafter referred to as negative threshold voltage Vn) are set so as to be different from each other. Thus, there are set two threshold voltages of the positive threshold voltage Vp and the negative threshold voltage Vn lower than the positive threshold voltage Vp.

Therefore, when the rising input voltage becomes higher than the positive threshold voltage Vp, the output signal is changed over from a "Lo" signal into a "Hi" signal. On the other hand, when the lowering input voltage becomes lower than the negative threshold voltage Vn, the output signal is changed over from a "Hi" signal into a "Lo" signal.

Figure 13:
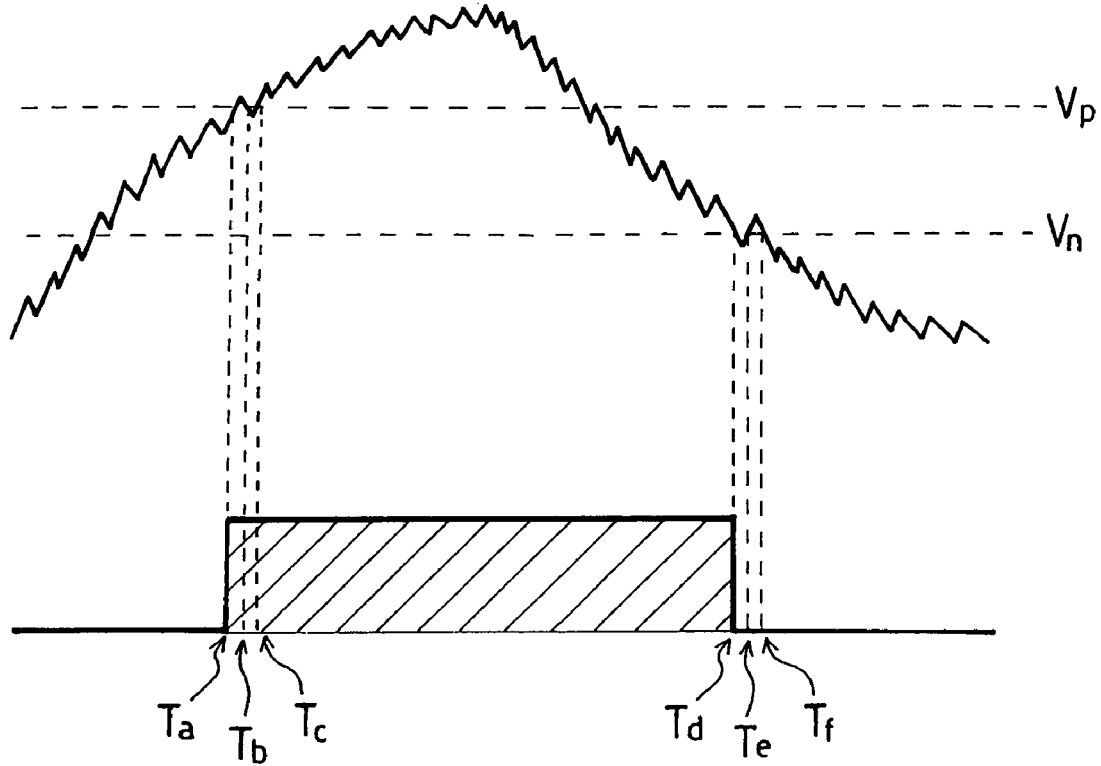
FIG. 13 is a chart showing a relation between an input voltage containing noise, and an output signal.

An output signal in the case that the input voltage contains noise will be described with reference to FIG. 13. FIG. 13 is a chart showing a relation between an input voltage containing noise, and an output signal.

First, when the input voltage containing noise rises, as shown in FIG. 13, the input voltage once becomes higher than the positive threshold voltage Vp at a time Ta. Afterward, the input voltage becomes lower than the positive threshold voltage Vp at a time Tb, and then again higher than the positive threshold voltage Vp at a time Tc. In this case, as described above, the output signal is changed over at the time Ta from a "Lo" signal into a "Hi" signal. Although the input voltage becomes lower than the positive threshold voltage Vp at the time Tb, the output signal is not changed over from the "Hi" signal into the next "Lo" signal because the input voltage does not become lower than the negative threshold voltage Vn. Thus, the output signal at the "Hi" level continues at the times Tb and Tc.

On the other hand, when the input voltage containing noise lowers, the input voltage once becomes lower than the negative threshold voltage Vn at a time Td. Afterward, the input voltage becomes higher than the negative threshold voltage Vn at a time Te, and then again lower than the negative threshold voltage Vn at a time Tf. In this case, as described above, the output signal is changed over at the time Td from the "Hi" signal into the next "Lo" signal. Although the input voltage becomes higher than the negative threshold voltage Vn at the time Te, the output signal is not changed over from the "Lo" signal into the next "Hi" signal because the input voltage does not become higher than the positive threshold voltage Vp. Thus, the output signal at the "Lo" level continues at the times Te and Tf.

As described above, even in the case that the input voltage varies around the positive and negative threshold voltages Vp and Vn because of the noise contained in the input voltage, it is suppressed to detect an erroneous output signal.

In the case that each of the Schmitt trigger type buffer elements 111 and 112 is a CMOS type element and the power supply voltage is Vcc, in general, the positive threshold voltage Vp is in between Vcc/2 and Vcc, and the negative threshold voltage Vn is in between zero and Vcc/2. In a general Schmitt trigger type buffer element, when the power supply voltage Vcc is 4.5 V, the positive threshold voltage Vp is 2.7 V, and the negative threshold voltage Vn is 1.6 V. As will be described later, the threshold voltage of a CMOS type logic element is around Vcc/2 in general.

As described above, the rectangular wave at the node X13, as shown in FIG. 12(e), and the rectangular wave at the node X14, as shown in FIG. 12(f), are input to the EX-OR element 131. An exclusive OR operation is performed for those signals, and the result of the operation is output to the terminal T11. In this case, the output signal Vx output to the terminal T11 is a rectangular wave signal having its duty ratio D1, as shown in FIG. 12(g).

Next, a case will be described wherein an operation in the X-axial positive direction is applied to the detective member 30, as shown in FIG. 6. In this case, as described above, because a portion of the detective member 30 corresponding to the X-axial positive direction is depressed, the portion of the detective member 30 corresponding to the X-axial positive direction is displaced downward and a portion of the detective member 30 corresponding to the X-axial negative direction is displaced upward. Thereby, the capacitance value of the capacitance element C1 increases and the capacitance value of the capacitance element C2 decreases. This brings about changes in the quantities of the delays of the periodic signals A and B, which were input to the terminals T1 and T2, by passing through the delay circuit constituted by the capacitance element C1 and the resistance element R1, and the delay circuit constituted by the capacitance element C2 and the resistance element R2.

Figure 10:
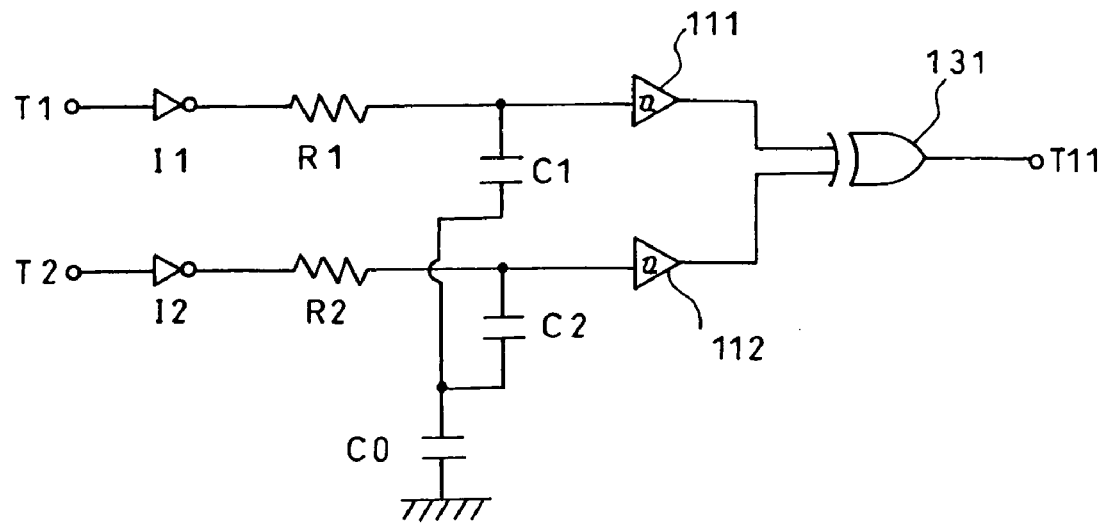
FIG. 10 are circuit diagrams showing signal processing circuits for X-axial component of the capacitance type sensor shown in FIG. 1.
Figure 10:
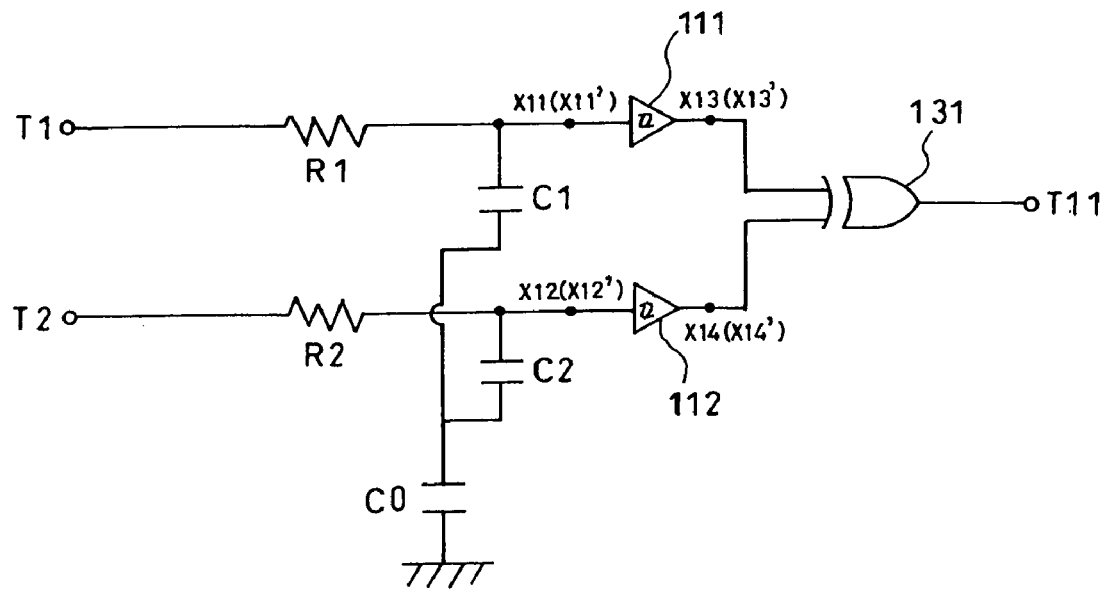

In the signal processing circuit of FIG. 10(*b*), the periodic signals A and B being input to the respective terminals T1 and T2 are delayed by passing through the delay circuit constituted by the capacitance element C1 and the resistance element R1, and the delay circuit constituted by the capacitance element C2 and the resistance element R2, in a state wherein the capacitance values of the capacitance elements C1 and C2 have changed; and then they reach nodes X11' and X12', respectively. Here, the nodes at the same positions as the nodes X11 and X12 of the signal processing circuit shown in FIG. 10(*b*) are denoted by X11' and X12', respectively, in the case that an operation in the X-axial positive direction is applied to the detective member 30. FIG. 12(*h*) shows a change in the potential at the node X11' of the signal processing circuit shown in FIG. 10(*b*). FIG. 12(*i*) shows a change in the potential at the node X12' of the signal processing circuit shown in FIG. 10(*b*).

In this embodiment, also in the case that the operation in the X-axial positive direction is applied to the detective member 30, the waveforms of the potentials at the nodes X11' and X12' are input to the respective Schmitt trigger type buffer elements 111 and 112 to be converted into rectangular waves. The converted rectangular waves are input to the EX-OR element 131. An exclusive OR operation is performed for those signals, and the result of the operation is output to the terminal T11. In this case, the output signal Vx output to the terminal T11 is a rectangular wave signal having its duty ratio D2, as shown in FIG. 12(*j*).

Next will be described the waveforms of periodic signals at terminals and nodes in the case of using, as a signal processing circuit of the capacitance type sensor 10 according to this embodiment, a signal processing circuit having no hysteretic characteristics, that is, a signal processing circuit in which the Schmitt trigger type buffer elements 111 and 112 have been removed from the signal processing circuit shown in FIG. 10(*b*).

In the case of the EX-OR element 131 as a CMOS type logic element used in the signal processing circuit shown in FIG. 11, only one threshold voltage is set while two different threshold voltages are set for each of the Schmitt trigger type buffer elements 111 and 112. When the input voltage becomes higher than the threshold voltage, the output signal is changed over from a "Lo" signal into a "Hi" signal. When the input voltage becomes lower than the threshold voltage, the output signal is changed over from a "Hi" signal into a "Lo" signal. Thereby, the output signal is converted into a rectangular wave signal. In the case of a CMOS type logic element, in many cases, the threshold voltage is set around Vcc/2 when the power supply voltage is Vcc.

In the signal processing circuit shown in FIG. 11, the periodic signals A and B being input to the respective terminals T1 and T2 are delayed by passing through the delay circuit constituted by the capacitance element C1 and the resistance element R1, and the delay circuit constituted by the capacitance element C2 and the resistance element R2, in a state wherein the detective member 30 is receiving no external force, i.e., no operation is applied to the detective member 30; and then they reaches nodes X21 and X22, respectively. At this time, the changes in the potentials at the nodes X21 and X22 of the signal processing circuit shown in FIG. 11 are the same as (*c*) and (*d*) of FIG. 12.

The waveforms of the potentials at the nodes X21 and X22 are input to the EX-OR element 131. After the waveforms of the potentials at the nodes X21 and X22 are converted into rectangular waves as described above, an exclusive OR operation is performed for those signals, and the result of the operation is input to the terminal T11. In this case, the output signal Vx output to the terminal T11 is a rectangular wave signal having its duty ratio D3, as shown in FIG. 12(*k*).

Next, a case will be described wherein an operation in the X-axial positive direction is applied to the detective member 30, as shown in FIG. 6. In this case, like the above-described case, the capacitance values of the capacitance elements C1 and C2 change.

In the signal processing circuit shown in FIG. 11, the periodic signals A and B being input to the respective terminals T1 and T2 are delayed by passing through the delay circuit constituted by the capacitance element C1 and the resistance element R1, and the delay circuit constituted by the capacitance element C2 and the resistance element R2, in a state wherein the capacitance values of the capacitance elements C1 and C2 have changed; and then they reach nodes X21' and X22', respectively. Here, the nodes at the same positions as the nodes X21 and X22 of the signal processing circuit shown in FIG. 11 are denoted by X21' and X22', respectively, in the case that an operation in the X-axial positive direction is applied to the detective member 30.

The waveforms at the nodes X11' and X12' are input to the EX-OR element 131. After the waveforms are converted into rectangular waves, an exclusive OR operation is performed for those signals, and the result of the operation is input to the terminal T11. In this case, the output signal Vx output to the terminal T11 is a rectangular wave signal having its duty ratio D4, as shown in FIG. 12(*l*).

As described above, in the case that a signal processing circuit having hysteretic characteristics, as shown in FIG. 10(*b*), is used as a signal processing circuit of the capacitance type sensor 10 according to this embodiment, the duty ratio of the output signal Vx output to the terminal T11 changes from D1 to D2 by applying an operation in the X-axial positive direction to the detective member 30 from a state wherein the detective member 30 is receiving no external force. On the other hand, in the case that a signal processing circuit having no hysteretic characteristics, as shown in FIG. 11, is used, the duty ratio of the output signal Vx output to the terminal T11 changes from D3 to D4 by applying an operation in the X-axial positive direction to the detective member 30 from a state wherein the detective member 30 is receiving no external force.

The quantity of the change between the duty ratio D1 of the rectangular wave signal of FIG. 12(*g*) and the duty ratio D2 of the rectangular wave signal of FIG. 12(*j*) is larger than the quantity of the change between the duty ratio D3 of the rectangular wave signal of FIG. 12(*k*) and the duty ratio D4 of the rectangular wave signal of FIG. 12(*l*). In many cases, the output signal Vx output to the terminal T11 is used after converted into an analogue voltage. In the case that the output signal Vx is converted into an analogue voltage, the quantities of the change between duty ratios of two rectangular wave signals are integrated. Therefore, in the case of using the signal processing circuit having hysteretic characteristics, as shown in FIG. 10(*b*), in which the quantity of the change in the duty ratio is large, the sensitivity characteristic of the sensor can be improved in comparison with the case of using the signal processing circuit having no hysteretic characteristics, as shown in FIG. 11.

As described above, in the capacitance type sensor 10 of this embodiment, because a signal processing circuit having hysteretic characteristics is used as a signal processing circuit of the sensor, the positive threshold voltage Vp for the input voltage rising and the negative threshold voltage Vn for the input voltage lowering are different from each other. The quantity of the change in the duty ratio of the output signal in the case of being detected by the signal processing circuit having hysteretic characteristics is larger than the quantity of the change in the duty ratio of the output signal in the case of being detected by a signal processing circuit having no hysteretic characteristics. Thus, the sensitivity characteristic of the sensor is improved.

In addition, even in the case that a periodic signal to be input contains noise, because the threshold voltage for the input voltage rising and the threshold voltage for the input voltage lowering are different from each other, it is suppressed to detect an erroneous output signal. Thus, the sensor can be prevented from erroneously operating by the influence of the noise.

Because the displacement electrode 40 used in common to constitute a plurality of capacitance elements C0 to C5 is electrically connected by capacitance coupling to the reference electrode E0 kept at the ground potential or another fixed potential, the displacement electrode 40 need not be in direct contact with the reference electrode E0 for electrical connection. Thereby, the withstand voltage characteristic of the sensor is improved, and the sensor is scarcely broken by a spark current flowing. In addition, malfunction such as a defect in electrical connection can be prevented. Thus, a capacitance type sensor high in reliability can be obtained. In addition, because the capacitance elements C1 and C0; C2 and C0; . . . ; and C5 and C0 are connected in series with respect to a periodic signal, wiring need not be provided for keeping the displacement electrode 40 at the ground potential or another fixed potential if wiring is provided on the substrate 20 supporting the capacitance element electrodes and the reference electrode. Therefore, the capacitance type sensor simple in construction can be manufactured in a small number of manufacturing steps.

Further, a plurality of capacitance element electrodes E1 to E5 are formed, and the X-axial, Y-axial, and Z-axial components of an external force received by the detective member 30 can be detected separately from one another. Because signals different from each other in phase are input to each pair of capacitance element electrodes, i.e., E1 and E2; and E3 and E4, the shifts in phase of the signals by passing through circuits can be made wide. Further, the signals can be accurately detected because a signal processing circuit utilizing logic elements is used.

Figure 14:
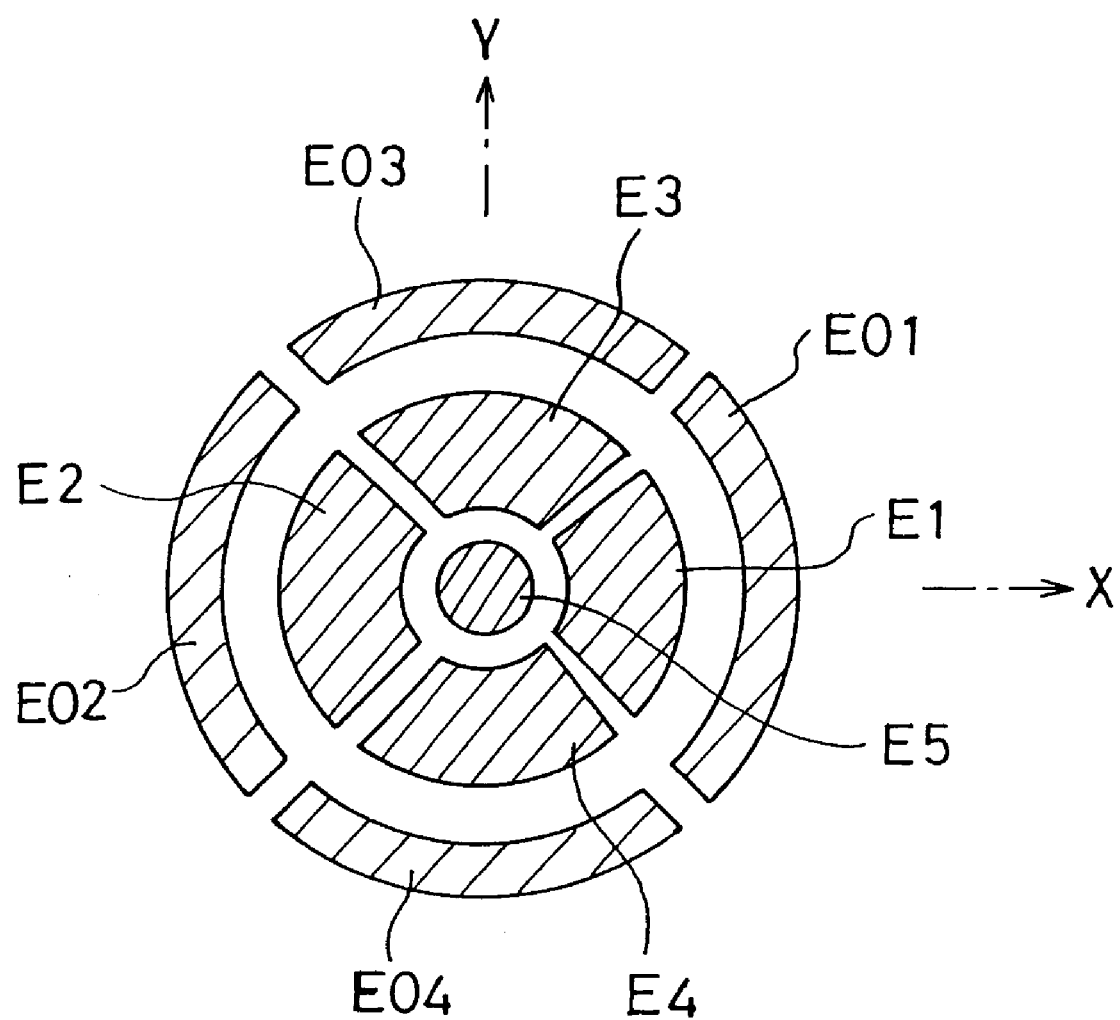
FIG. 14 is a view showing an arrangement of a plurality of electrodes formed on the substrate of the capacitance type sensor of FIG. 1, according to a first modification.

Next, a first modification of the embodiment of the present invention will be described with reference to drawings. FIG. 14 is a view showing an arrangement of a plurality of electrodes formed on a substrate of a capacitance type sensor according to the first modification.

In the capacitance type sensor according to the first modification, the constitution of the reference electrode E0 on the substrate 20 of the capacitance type sensor of FIG. 1 has been modified so that reference electrodes E01 to E04 are formed as shown in FIG. 14. The other constitutions are the same as those of the capacitance type sensor of FIG. 1, and thus the same references as the capacitance type sensor of FIG. 1 for the constitutions are used, thereby omitting the description thereof.

On the substrate 20, as shown in FIG. 14, there are formed a circular capacitance element electrode E5 having its center at the origin O; fan-shaped capacitance element electrodes E1 to E4 disposed outside the capacitance element electrode E5; and fan-shaped reference electrodes E01 to E04 disposed outside the capacitance element electrodes E1 to E4. In this modification, each pair of capacitance element electrode E1 and reference electrode E01; capacitance element electrode E2 and reference electrode E02; capacitance element electrode E3 and reference electrode E03; and capacitance element electrode E1 and reference electrode E01 have the same central angle of the fan shape, and are formed so as to have the same center.

Figure 15:
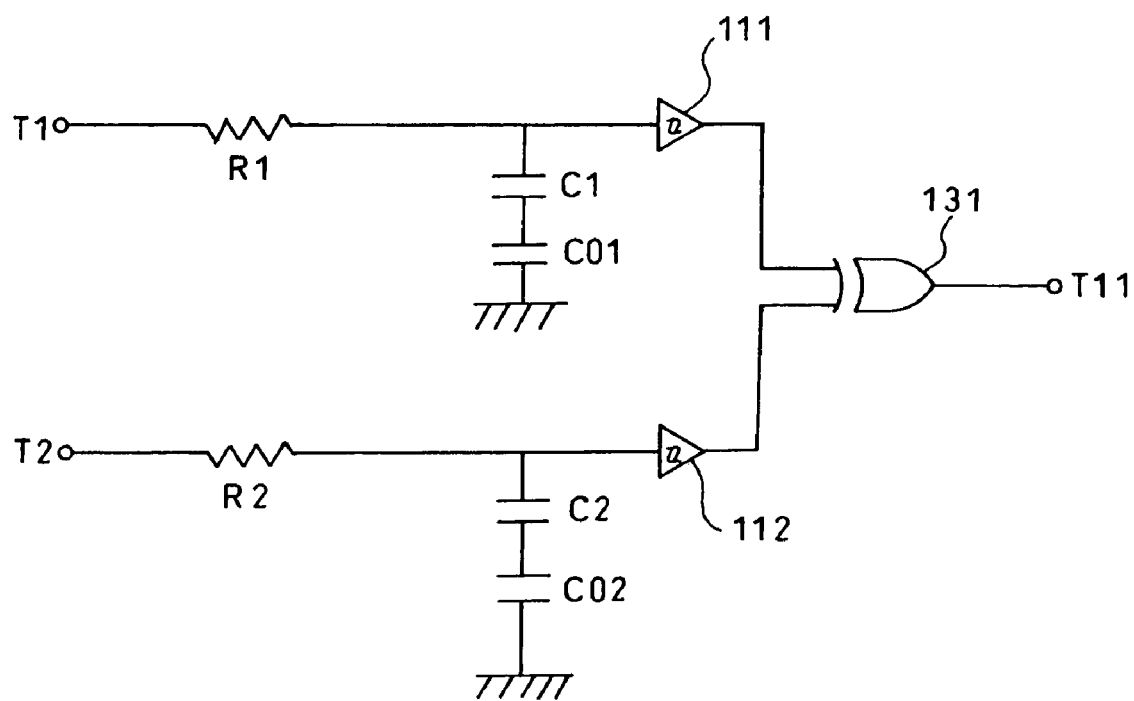
FIG. 15 is a circuit diagram showing a signal processing circuit for X-axial component of the capacitance type sensor shown in FIG. 1, according to the first modification.

FIG. 15 is a circuit diagram showing a signal processing circuit for X-axial component of the capacitance type sensor according to the first modification. The different point of the signal processing circuit of FIG. 15 from the signal processing circuit of the capacitance type sensor of FIG. 1 is that the reference electrodes E01 and E02 on the substrate 20 are formed separately for the respective capacitance element electrodes E1 and E2. Therefore, the displacement electrode 40 is grounded at separate positions through capacitance elements C01 and C02, respectively. The same applies to detection for a Y-axial component.

When a plurality of reference electrodes E01 to E04 are thus dividedly formed, even in the case that the capacitance element electrodes E1 to E4 are surrounded by the reference electrodes E01 to E04, wiring for the capacitance element electrodes can easily be provided through the intervals between the reference electrodes E01 to E04. Although the reference electrode is divided into four in this modification, the number of divided reference electrodes and the shape and arrangement of the divided reference electrodes are arbitrary, and they can be adequately changed in consideration of the arrangement of wiring on the substrate.

Figure 16:
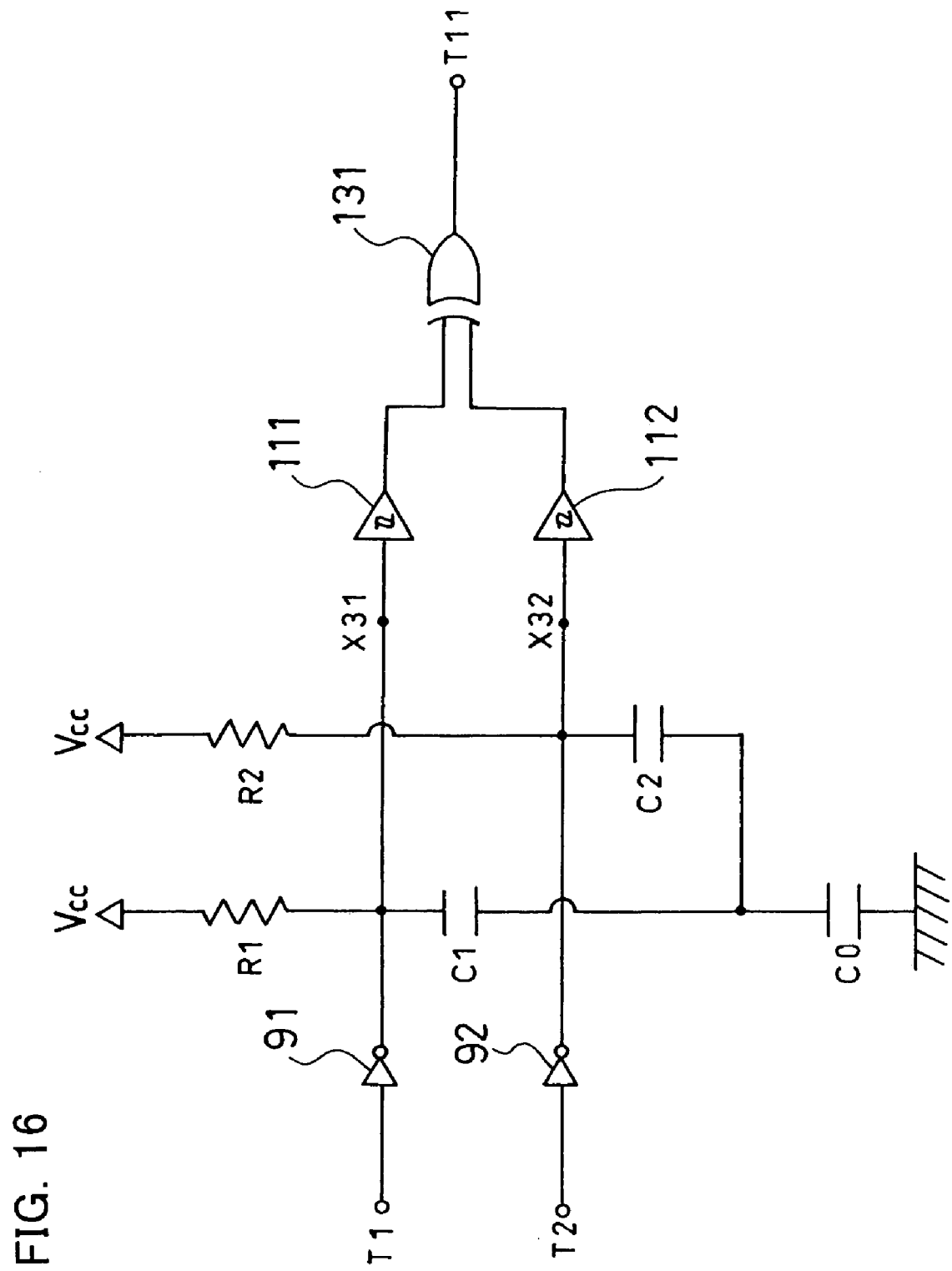
FIG. 16 is a circuit diagram showing a signal processing circuit for X-axial component of the capacitance type sensor shown in FIG. 1, according to a second modification.

Next, a second modification of the embodiment of the present invention will be described with reference to drawings. FIG. 16 is a circuit diagram showing a signal processing circuit for X-axial component of the capacitance type sensor, according to the second modification. The signal processing circuit of FIG. 16 differs from the signal processing circuit of the capacitance type sensor of FIG. 1 on the points that: an open collector type inverter element 91 is provided between the terminal T1 and the resistance element R1 and the capacitance element C1; likewise, an open collector type inverter element 92 is provided between the terminal T2 and the resistance element R2 and the capacitance element C2; and the terminals of the resistance elements R1 and R2 opposite to the terminals of the resistance elements R1 and R2 connected to the terminals T1 and T2 are kept at a fixed potential Vcc. The other construction is the same as that of the capacitance type sensor of FIG. 1, and thus the same references are used for the other construction to omit the description thereof. The open collector type inverter elements 91 and 92 are control elements each having a function of having no influence upon the input terminal of the corresponding EX-OR element when the signal being input to the corresponding capacitance element electrode with periodically repeating high and low levels is at the high level; and discharging the capacitance element when the signal is at the low level.

Changes in the potentials at the nodes X11 and X12 of the signal processing circuit shown in FIG. 10(b) and at the nodes X31 and X32 of the signal processing circuit shown in FIG. 16 when periodic signals are being input to the terminals T1 and T2 will be described with reference to FIG. 17. Here, only the changes in the potentials at the nodes X11 and X31 will be described.

Figure 17:
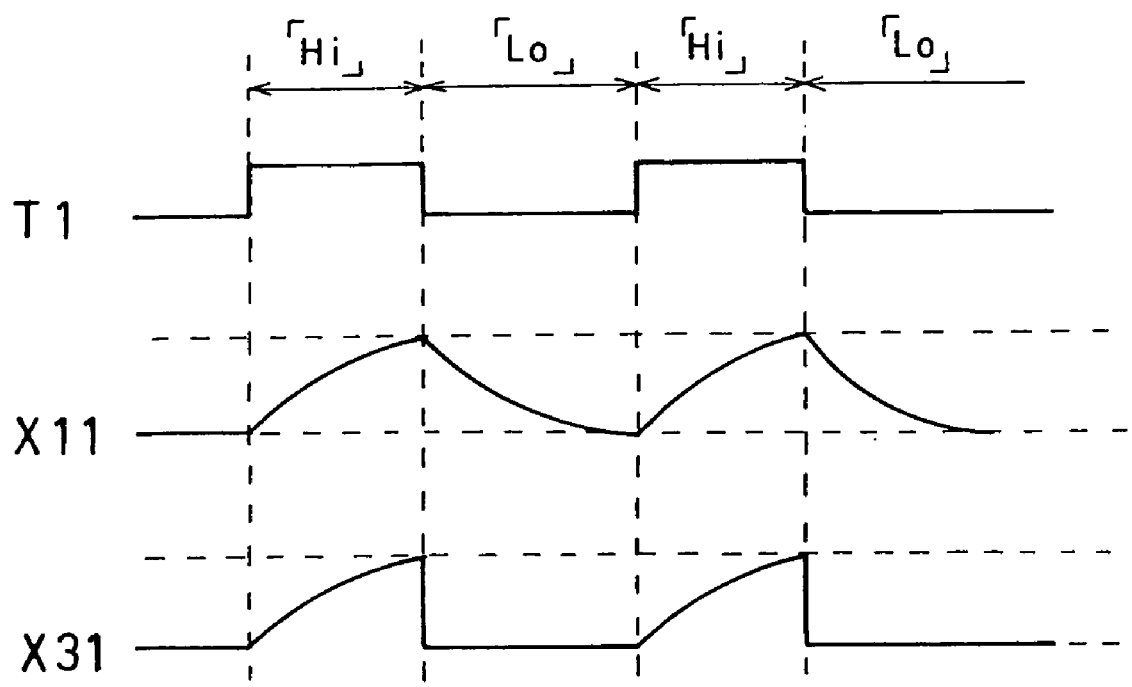
FIG. 17 is a chart showing waveforms of periodic signals at a terminal and nodes of a signal processing circuit shown in FIG. 1 and the signal processing circuit shown in FIG. 16.

As shown in FIG. 17, a case wherein a signal in which "Hi" and "Lo" signals are repeated is being input to the terminal T1 will be described. After the input of an "Hi" signal starts, the potential at the node X11 gradually rises because electric charges are gradually accumulated in the capacitance element C1 constituting a CR delay circuit. After the input of a "Lo" signal starts, the potential at the node X11 gradually lowers because electric charges are gradually released from the capacitance element C1 constituting the CR delay circuit. These changes are repeated. On the other hand, after the input of an "Hi" signal starts, the potential at the node X31 gradually rises because electric charges are gradually accumulated in the capacitance element C1 constituting the CR delay circuit. After the input of a "Lo" signal starts, the potential at the node 31 lowers in a moment because electric charges are released from the capacitance element C1 constituting the CR delay circuit, in a moment through the open collector type inverter element 91. These changes are repeated.

When the above-described construction is adopted and the duty ratio of the periodic signal being input to the terminal T1 is increased, charging each capacitance element can be efficiently performed because electric charges are released from the capacitance element in a moment. Additionally, in the signal processing circuit of FIG. 16, the cycle of the periodic signal can be shortened in comparison with that of the signal processing circuit of FIG. 10(b), and thereby the density of waveforms can be increased. Thus, the sensitivity of the signal processing circuit can be improved.

Figure 18:
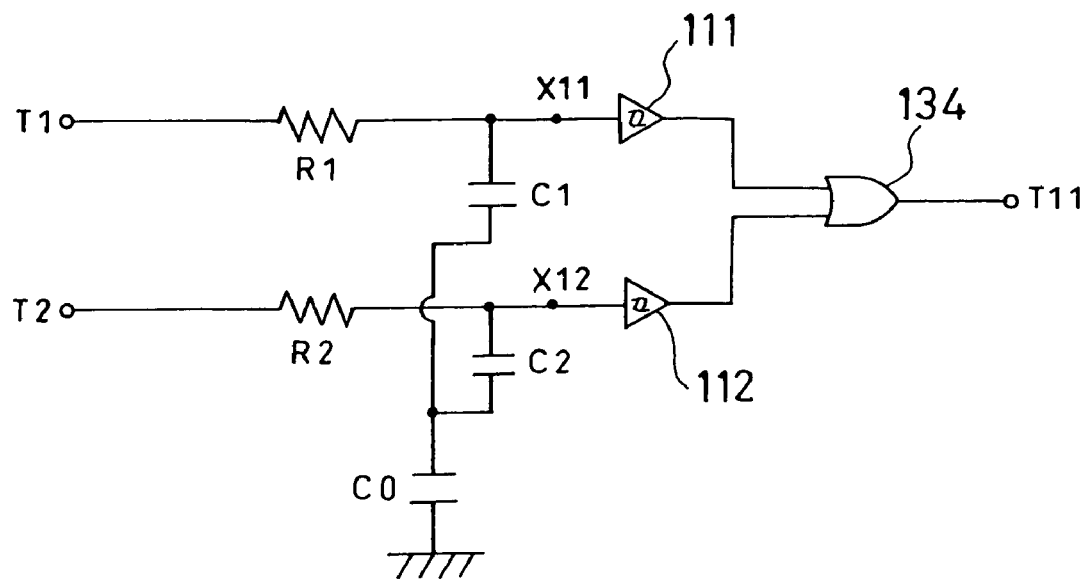
FIG. 18 is a circuit diagram showing a signal processing circuit for X-axial component of the capacitance type sensor shown in FIG. 1, according to a third modification.

Next, a third modification of the embodiment of the present invention will be described with reference to a drawing. FIG. 18 is a circuit diagram showing a signal processing circuit for X-axial component of the capacitance type sensor, according to the third modification. The signal processing circuit of FIG. 18 differs from the signal processing circuit of the capacitance type sensor of FIG. 1 on the point that an OR element is used as a logic element in place of the EX-OR element. The other construction is the same as that of the capacitance type sensor of FIG. 1, and thus the same references are used for the other construction to omit the description thereof.

In FIG. 18, the periodic signal A being input to the terminal T1 passes through the CR delay circuit constituted by the capacitance element C1 and the resistance element R1, and then reaches the node X11. At this time, the periodic signal at the node X11 has a predetermined delay, as shown in FIG. 12. Likewise, the periodic signal B being input to the terminal T12 passes through the CR delay circuit constituted by the capacitance element C2 and the resistance element R2, and then reaches the node X12. At this time, the periodic signal at the node X12 has a predetermined delay. Similarly to the case of FIG. 10(b), signals that the periodic signals at the nodes X11 and X12 have been converted by passing through the Schmitt trigger type buffer elements 111 and 112 are input to an OR element 134. An OR operation is performed between those signals, and the result of the operation is output to the terminal T11. In this case, the signal output to the terminal T11 is a rectangular wave signal having a predetermined duty ratio.

The quantity of the change in duty ratio of the rectangular wave signal output to the terminal T11 when the OR element 134 is used, from the rectangular wave signal output to the terminal T11 when the detective member 30 is receiving no operation, is smaller than that of the rectangular wave signal output to the terminal T11 when the EX-OR element 131 is used. For this reason, the sensitivity characteristic of the capacitance type sensor may be lowered.

Therefore, this modification is preferably used for controlling the sensitivity characteristic of the capacitance type sensor, particularly lowering the sensitivity characteristic, by the construction of the signal processing circuit in the case that each component of the capacitance type sensor is made of a material that can make the sensitivity characteristic very good.

Figure 19:
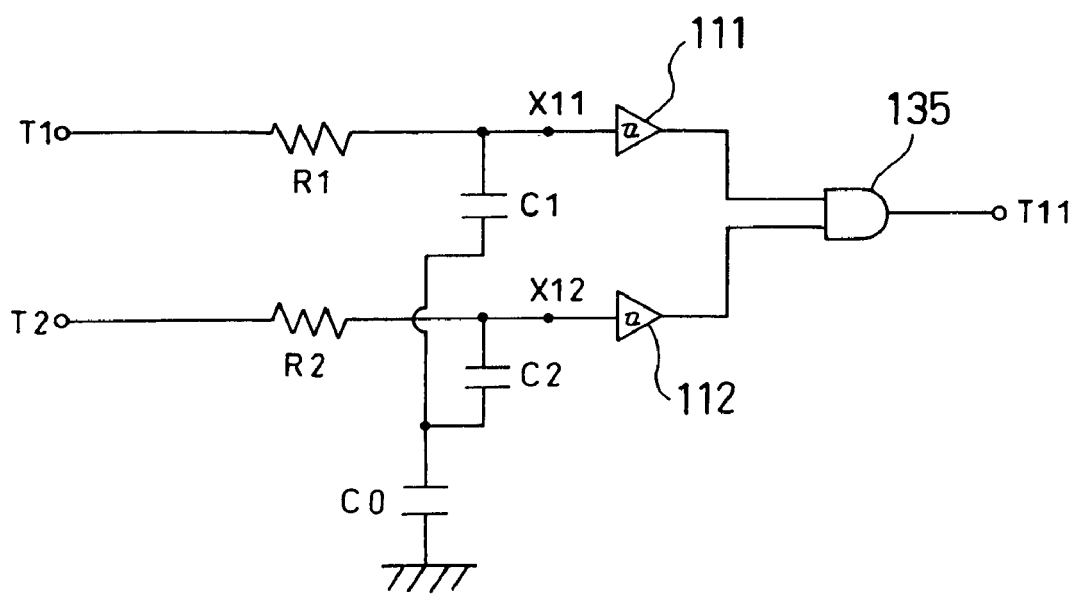
FIG. 19 is a circuit diagram showing a signal processing circuit for X-axial component of the capacitance type sensor shown in FIG. 1, according to a fourth modification.

Next, a fourth modification of the embodiment of the present invention will be described with reference to a drawing. FIG. 19 is a circuit diagram showing a signal processing circuit for X-axial component of the capacitance type sensor, according to the fourth modification. The signal processing circuit of FIG. 19 differs from the signal processing circuit of the capacitance type sensor of FIG. 1 on the point that an AND element is used as a logic element in place of the EX-OR element. The other construction is the same as that of the capacitance type sensor of FIG. 1, and thus the same references are used for the other construction to omit the description thereof.

In FIG. 18, the periodic signal A being input to the terminal T1 passes through the CR delay circuit constituted by the capacitance element C1 and the resistance element R1, and then reaches the node X11. At this time, the periodic signal at the node X11 has a predetermined delay, as shown in FIG. 12. Likewise, the periodic signal B being input to the terminal T12 passes through the CR delay circuit constituted by the capacitance element C2 and the resistance element R2, and then reaches the node X12. At this time, the periodic signal at the node X12 has a predetermined delay. Similarly to the case of FIG. 10(b), signals that the periodic signals at the nodes X11 and X12 have been converted by passing through the Schmitt trigger type buffer elements 111 and 112 are input to an AND element 135. An AND operation is performed between those signals, and the result of the operation is output to the terminal T11. In this case, the signal output to the terminal T11 is a rectangular wave signal having a predetermined duty ratio.

The quantity of the change in duty ratio of the rectangular wave signal output to the terminal T11 when the AND element 135 is used, from the rectangular wave signal output to the terminal T11 when the detective member 30 is receiving no operation, is smaller than that of the rectangular wave signal output to the terminal T11 when the EX-OR element 131 is used. For this reason, the sensitivity characteristic of the capacitance type sensor may be lowered.

Therefore, this modification is preferably used for controlling the sensitivity characteristic of the capacitance type sensor, particularly lowering the sensitivity characteristic, by the construction of the signal processing circuit in the case that each component of the capacitance type sensor is made of a material that can make the sensitivity characteristic very good.

Figure 20:
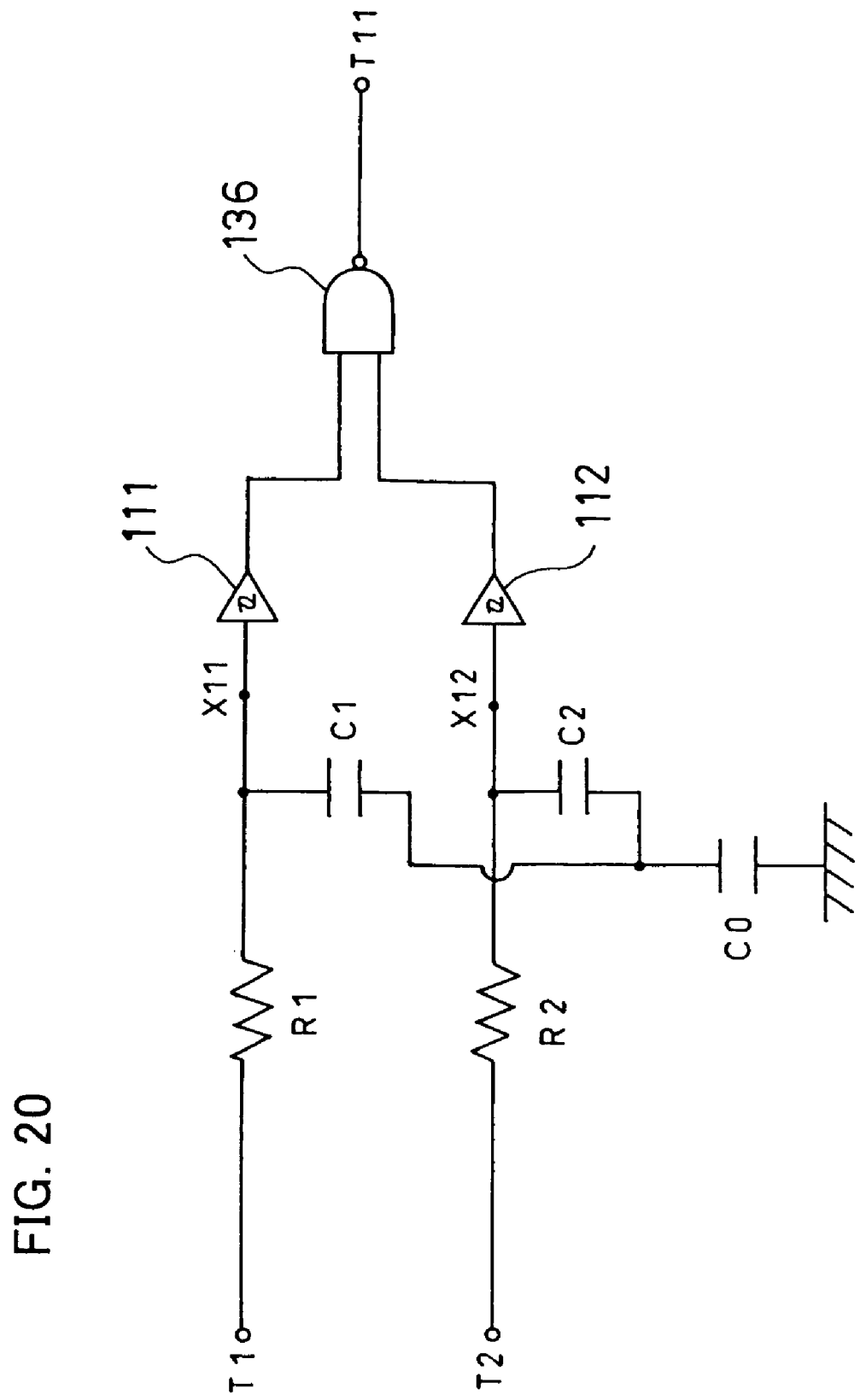
FIG. 20 is a circuit diagram showing a signal processing circuit for X-axial component of the capacitance type sensor shown in FIG. 1, according to a fifth modification.

Next, a fifth modification of the embodiment of the present invention will be described with reference to a drawing. FIG. 20 is a circuit diagram showing a signal processing circuit for X-axial component of the capacitance type sensor, according to the fifth modification. The signal processing circuit of FIG. 20 differs from the signal processing circuit of the capacitance type sensor of FIG. 1 on the point that a NAND element is used as a logic element in place of the EX-OR element. The other construction is the same as that of the capacitance type sensor of FIG. 1, and thus the same references are used for the other construction to omit the description thereof.

In FIG. 20, the periodic signal A being input to the terminal T1 passes through the CR delay circuit constituted by the capacitance element C1 and the resistance element R1, and then reaches the node X11. At this time, the periodic signal at the node X11 has a predetermined delay, as shown in FIG. 12. Likewise, the periodic signal B being input to the terminal T12 passes through the CR delay circuit constituted by the capacitance element C2 and the resistance element R2, and then reaches the node X12. At this time, the periodic signal at the node X12 has a predetermined delay. Similarly to the case of FIG. 10(b), signals that the periodic signals at the nodes X11 and X12 have been converted by passing through the Schmitt trigger type buffer elements 111 and 112 are input to a NAND element 136. A NAND operation is performed between those signals, and the result of the operation is output to the terminal T11. In this case, the signal output to the terminal T11 is a rectangular wave signal having a predetermined duty ratio.

The quantity of the change in duty ratio of the rectangular wave signal output to the terminal T11 when the NAND element 136 is used, from the rectangular wave signal output to the terminal T11 when the detective member 30 is receiving no operation, is smaller than that of the rectangular wave signal output to the terminal T11 when the EX-OR element 131 is used. For this reason, the sensitivity characteristic of the capacitance type sensor may be lowered.

Therefore, this modification is preferably used for controlling the sensitivity characteristic of the capacitance type sensor, particularly lowering the sensitivity characteristic, by the construction of the signal processing circuit in the case that each component of the capacitance type sensor is made of a material that can make the sensitivity characteristic very good.

Figure 21:
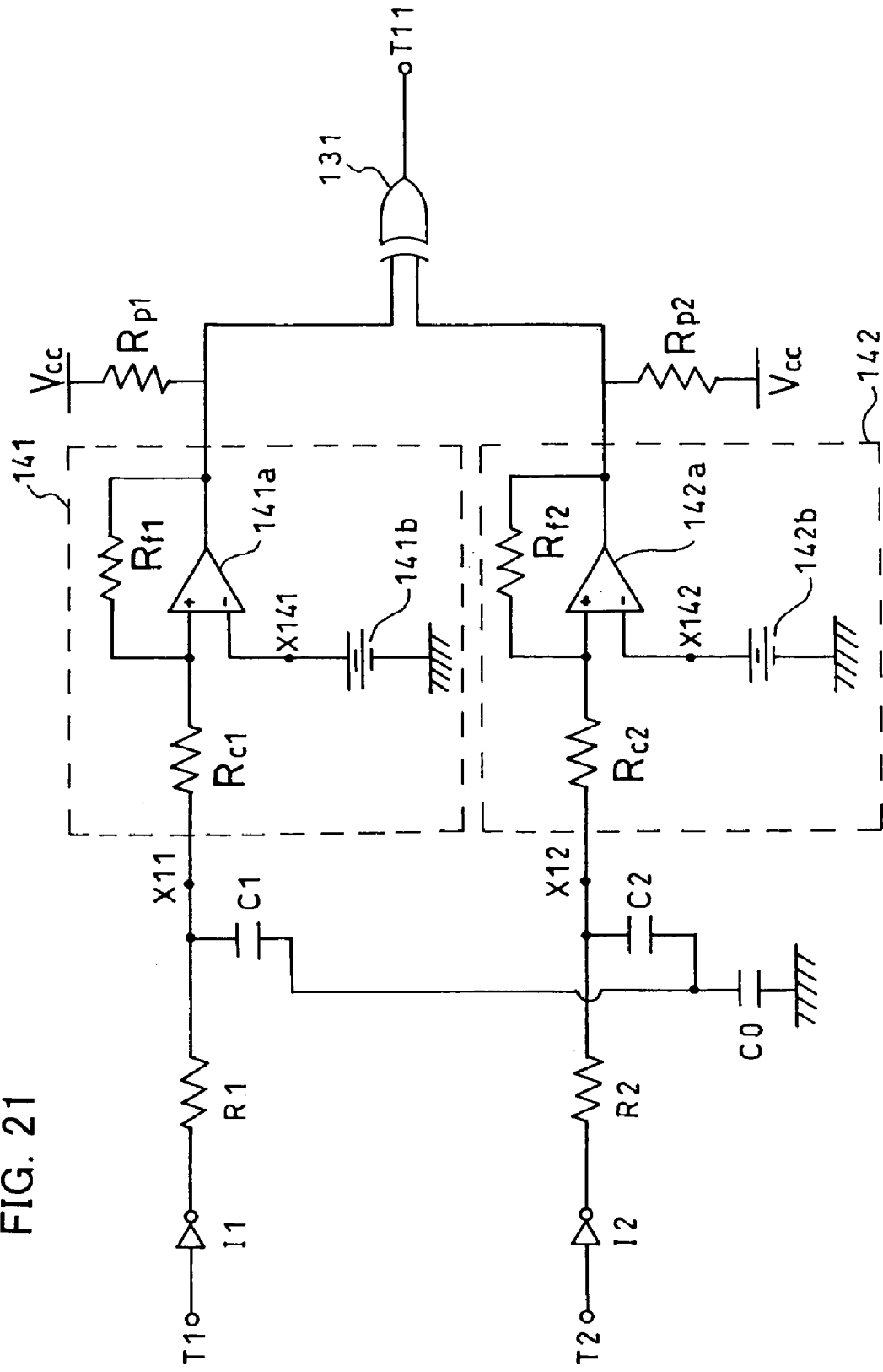
FIG. 21 is a circuit diagram showing a signal processing circuit for X-axial component of the capacitance type sensor shown in FIG. 1, according to a sixth modification.

Next, a sixth modification of the embodiment of the present invention will be described with reference to a drawing. FIG. 21 is a circuit diagram showing a signal processing circuit for X-axial component of the capacitance type sensor, according to the sixth modification. The signal processing circuit of FIG. 21 differs from the signal processing circuit of the capacitance type sensor of FIG. 1 on the point that hysteresis comparators 141 and 142 are used in place of the Schmitt trigger type buffer elements 111 and 112. The other construction is the same as that of the capacitance type sensor of FIG. 1, and thus the same references are used for the other construction to omit the description thereof.

The hysteresis comparators 141 and 142 are made up of comparators 141a and 142a, variable resistors Rf1 and Rf2, reference voltages 141b and 142b, and resistance elements Rc1 and Rc2, respectively. Resistance elements Rp1 and Rp2 as pull-up resistances are connected to the output terminals of the respective comparators 141a and 142a. The terminals of the resistance elements Rp1 and Rp2 opposite to the output terminals of the resistance elements Rp1 and Rp2 are kept at a fixed potential Vcc.

One input terminal of the comparator 141a is connected to the output terminal of the resistance element Rc1, and the other input terminal is connected to the reference voltage 141b. Thus, a node X141 between the comparator 141a and the reference voltage 141b is kept at a predetermined potential. A node between the one input terminal of the comparator 141a and the resistance element Rc1 is connected through the variable resistor Rf1 to a node between the output terminal of the comparator 141a and an EX-OR element 131. The node between the output terminal of the comparator 141a and the EX-OR element 131 is connected to the resistance element Rp1 so as to pull up the output of the comparator 141a. The hysteresis comparator 142 is the same as the hysteresis comparator 141 in construction, and thus the description of the construction of the hysteresis comparator 142 is omitted.

In the hysteresis comparator 141, there are below relations among the power supply voltage Vcc, the positive threshold voltage Vp, the negative threshold voltage Vn, and the hysteresis voltage Vht as the voltage difference between Vp and Vn. In the below equations, the resistance value of the variable resistor Rf1 included in the hysteresis comparator 141 is represented by Rf; the resistance value of the resistance element Rc1 is represented by Rc; and the voltage value of the reference voltage 141b is represented by Vref. Also in the hysteresis comparator 142, there are the same relations.

$$V_p = V_{ref}(R_c + R_f)/R_f \qquad \text{Equation 1}$$

$$V_n = \{V_{ref}(R_c + R_f) - V_{cc}R_c\}/R_f \qquad \text{Equation 2}$$

$$V_{ht} = V_{cc}R_c/R_f \qquad \text{Equation 3}$$

For example, in the hysteresis comparator 141, when the power supply voltage Vcc, the voltage of the reference voltage 141b, the resistance value Rc of the resistance element Rc1, and the resistance value Rf of the variable resistor Rf1 are 5 V, 2.5 V, 10 kilohm, and 100 kilohm, respectively, the positive threshold voltage Vp, the negative threshold voltage Vn, and the hysteresis voltage Vht are 2.75 V, 2.25 V, and 0.5 V, respectively.

In this modification, the input voltages of the hysteresis comparators 141 and 142 suffer conversion processing similar to that for the input voltages of the Schmitt trigger type buffer elements 111 and 112. That is, when the input voltage rises to more than the positive threshold voltage Vp, the output signal is changed over from a "Lo" signal to a "Hi" signal. On the other hand, when the input voltage lowers to less than the negative threshold voltage Vn, the output signal is changed over from a "Hi" signal to a "Lo" signal.

In FIG. 21, the periodic signal A being input to the terminal T1 passes through the CR delay circuit constituted by the capacitance element C1 and the resistance element R1, and then reaches the node X11. At this time, the periodic signal at the node X11 has a predetermined delay, as shown in FIG. 12. Likewise, the periodic signal B being input to the terminal T2 passes through the CR delay circuit constituted by the capacitance element C2 and the resistance element R2, and then reaches the node X12. At this time, the periodic signal at the node X12 has a predetermined delay. Thus, like the case of FIG. 10(b), rectangular wave signals converted from the periodic signals at the nodes X11 and X12 by passing through the respective hysteresis comparators 141 and 142 are input to the EX-OR element 131, where an exclusive OR operation is performed to those signals and the result of the operation is output to the terminal T11. In this case, the signal output to the terminal T11 is a rectangular wave signal having a predetermined duty ratio.

As described above, to make the capacitance type sensor 10 of this embodiment have hysteretic characteristics, a hysteresis comparator can be used in place of using a Schmitt trigger type buffer element. In such a hysteresis comparator, its hysteresis voltage Vht as the difference between its positive and negative threshold voltages Vp and Vn can be arbitrarily changed by changing the resistance value of a variable resistor constituting the hysteresis comparator, such as Rf1 or Rf2 in FIG. 21. Thus, the sensitivity characteristic of the capacitance type sensor can be easily controlled by the construction of its signal processing circuit.

Figure 22:
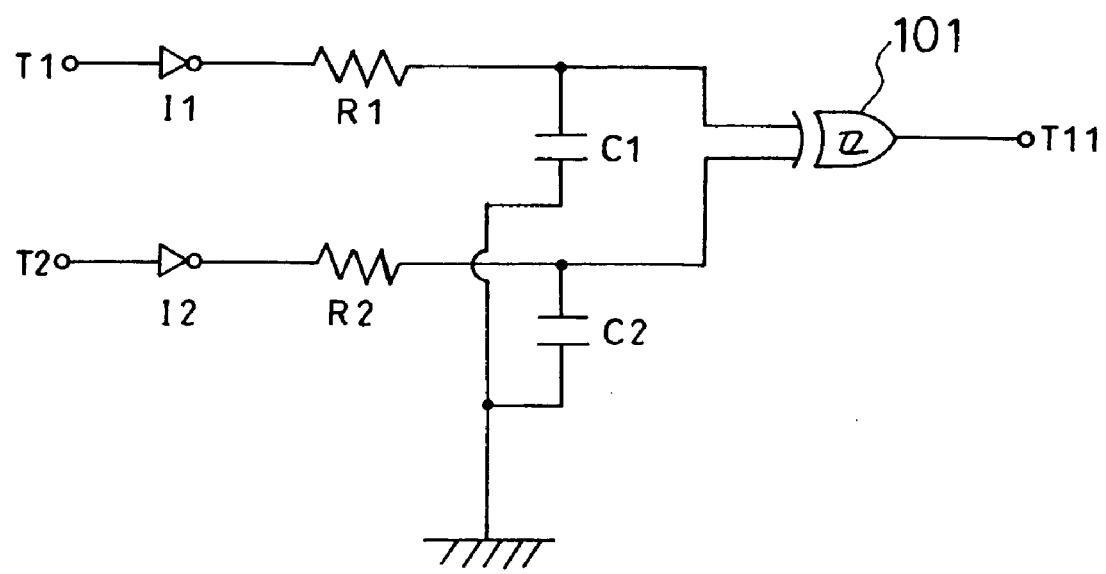
FIG. 22 is a circuit diagram showing a signal processing circuit for X-axial component of the capacitance type sensor shown in FIG. 1, according to a seventh modification.

Next, a seventh modification of the embodiment of the present invention will be described with reference to a drawing. FIG. 22 is a circuit diagram showing a signal processing circuit for X-axial component of the capacitance type sensor, according to the seventh modification. The signal processing circuit of FIG. 22 differs from the signal processing circuit of the capacitance type sensor of FIG. 1 on the point that the displacement electrode 40 as one electrodes of the capacitance elements C1 and C2 is directly grounded without connecting through the capacitance element C0. The other construction is the same as that of the capacitance type sensor of FIG. 1, and thus the same references are used for the other construction to omit the description thereof.

The displacement electrode 40 is grounded through wiring provided separately, and the reference electrode E0 need not be formed on the substrate 20. Therefore, wiring for the capacitance element electrodes can be easily provided on the substrate 20.

Although a preferred embodiment of the present invention has been described, the present invention is not limited to the above-described embodiment, and various changes in design can be made within the scope of the description of claims. For example, in the above-described embodiment, a signal processing circuit is used that has hysteretic characteristics by utilizing a Schmitt trigger type logic element, a Schmitt trigger type buffer element, a Schmitt trigger type inverter element, or a hysteresis comparator. However, the present invention is not limited to this. Any construction of a signal processing circuit can be used if it has hysteretic characteristics similar to those of the above-described embodiment.

In the above-described embodiment, the displacement electrode is displaced relatively to the fixed capacitance element electrodes so as to change the capacitance values of the capacitance elements formed between the displacement electrode and the respective capacitance element electrodes. However, the present invention is not limited to this. Any construction may be used for changing the capacitance value of a capacitance element. For example, an insulating member may be moved between a fixed capacitance element electrode and a fixed conductive member so as to change the capacitance value of the capacitance element formed between the capacitance element electrode and the conductive member.

In the above-described embodiment, the capacitance element electrodes are formed so as to correspond to three of X-, Y-, and Z-axes. However, capacitance element electrodes may be formed so as to be able to detect only necessary axial components in accordance with application.

INDUSTRIAL APPLICABILITY

A capacitance type sensor of the present invention is most suitable for use as an input device for a personal computer, a portable telephone, a game machine, or the like; a force sensor; an acceleration sensor; or a pressure sensor.

The invention claimed is:

1. A capacitance type sensor comprising:
a substrate that provides an XY plane of an XYZ three-dimensional coordinate system;
a detective member being opposed to the substrate;
a conductive member disposed between the substrate and the detective member so as to be Z-axially displaceable in accordance with Z-axial displacement of the detective member;
a capacitance element electrode formed on the substrate to cooperate with the conductive member to form a first capacitance element; and
a reference electrode formed on the substrate to cooperate with the conductive member to form a second capacitance element, and kept at a ground potential or another fixed potential,
wherein the first and second capacitance elements are connected in series in relation to a signal input to the capacitance element electrode, and displacement of the detective member can be detected on the basis of detection of a change in the capacitance value of the first capacitance element caused by a change in the interval between the conductive member and the capacitance element electrode; and
wherein the capacitance type sensor comprises two capacitance element electrodes in a pair, and after each of analog signals corresponding to signals respectively input to a circuit including one of the capacitance element electrodes and a circuit including the other of the capacitance element electrodes, has passed the respective signal processing circuit having hysteretic characteristics and the analog signals are input to a logic element, an output signal is output from the logic element.

2. The capacitance type sensor according to claim 1, wherein the capacitance element electrode includes a pair of first capacitance element electrodes disposed symmetrically with respect to a Y axis, a pair of second capacitance element electrodes disposed symmetrically with respect to an X axis, and a third capacitance element electrode disposed near an origin.

3. The capacitance type sensor according to claim 1, wherein a threshold value of the signal processing circuit for an increasing input signal is higher than a threshold value of the signal processing circuit for a decreasing input signal.

4. The capacitance type sensor according to claim 1, wherein a Schmitt trigger type buffer element is utilized in the signal processing circuit.

5. The capacitance type sensor according to claim 1, wherein a Schmitt trigger type inverter element is utilized in the signal processing circuit.

6. The capacitance type sensor according to claim 1, wherein a hysteresis comparator is utilized in the signal processing circuit.

7. The capacitance type sensor according to claim 1, wherein a circuit including one of the capacitance element electrodes and a circuit including the other of the capacitance element electrodes are provided with a signal at a different phase of each other.

8. The capacitance type sensor according to claim 1, wherein the time constant between a CR circuit including one of the capacitance element electrodes and a CR circuit including the other of the capacitance element electrodes is different.

9. The capacitance type sensor according to claim 1, wherein the signal periodically, repeats high-level and low-level, and a control element having a function of discharging the first capacitance element when the signal is at the low-level is provided.

10. The capacitance type sensor according to claim 9, wherein an open collector type inverter element is used as the control element.

11. A capacitance type sensor comprising:

a substrate that provides an XY plane of an XYZ three-dimensional coordinate system;

a detective member being opposed to the substrate;

a conductive member disposed between the substrate and the detective member so as to be Z-axially displaceable in accordance with Z-axial displacement of the detective member;

a capacitance element electrode formed on the substrate to cooperate with the conductive member to form a first capacitance element; and a reference electrode formed on the substrate to cooperate with the conductive member to form a second capacitance element, and kept at a ground potential or another fixed potential;

wherein the first and second capacitance elements are connected in series in relation to a signal input to the capacitance element electrode, and displacement of the detective member can be detected on the basis of detection of a change in the capacitance value of the first capacitance element caused by a change in the interval between the conductive member and the capacitance element electrode; and wherein the sensor comprises two capacitance element electrodes in a pair, and each of analog signals corresponding to signals respectively input to a circuit including one of the capacitance element electrodes and a circuit including the other of the capacitance element electrodes is input to a Schmitt trigger type logic element having Schmitt trigger input characteristics and an output signal is output from the Schmitt trigger type logic element.

12. The capacitance type sensor according to claim 11, wherein the capacitance element electrode includes a pair of first capacitance element electrodes disposed symmetrically with respect to a Y axis, a pair of second capacitance element electrodes disposed symmetrically with respect to an X axis, and a third capacitance element electrode disposed near an origin.

13. The capacitance type sensor according to claim 11, wherein a threshold value of the signal processing circuit for an increasing input signal is higher than a threshold value of the signal processing circuit for a decreasing input signal.

14. The capacitance type sensor according to claim 11, wherein the Schmitt trigger type logic element implements the exclusive logical OR operation.

15. The capacitance type sensor according to claim 11, wherein the Schmitt trigger type logic element implements the logical OR operation.

16. The capacitance type sensor according to claim 11, wherein the Schmitt trigger type logic element implements the logical AND operation.

17. The capacitance type sensor according to claim 11, wherein the Schmitt trigger type logic element implements the logical AND operation and the logical NOT operation.

18. The capacitance type sensor according to claim 11, wherein a circuit including one of the capacitance element electrodes and a circuit including the other of the capacitance element electrodes are provided with a signal at a different phase of each other.

19. The capacitance type sensor according to claim 11, wherein the time constant between a CR circuit including one of the capacitance element electrodes and a CR circuit including the other of the capacitance element electrodes is different.

20. The capacitance type sensor according to claim 11, wherein the signal periodically repeats high-level and low-level, and a control element having the function of discharging the first capacitance element when the signal is at a low-level is provided.

21. The capacitance type sensor according to claim 20, wherein an open collector type inverter element is used as the controlling element.

* * * * *